(12) United States Patent
Sakai et al.

(10) Patent No.: US 10,254,455 B2
(45) Date of Patent: Apr. 9, 2019

(54) MIRROR DISPLAY AND MIRROR DISPLAY UNIT

(71) Applicant: Sharp Kabushiki Kaisha, Sakai, Osaka (JP)

(72) Inventors: Akira Sakai, Sakai (JP); Masahiro Hasegawa, Sakai (JP); Hiroyuki Hakoi, Sakai (JP); Kiyoshi Minoura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 125 days.

(21) Appl. No.: 15/314,545

(22) PCT Filed: Jun. 3, 2015

(86) PCT No.: PCT/JP2015/066023
§ 371 (c)(1),
(2) Date: Nov. 29, 2016

(87) PCT Pub. No.: WO2015/186734
PCT Pub. Date: Dec. 10, 2015

(65) Prior Publication Data
US 2017/0199311 A1 Jul. 13, 2017

(30) Foreign Application Priority Data

Jun. 5, 2014 (JP) .................................. 2014-116891

(51) Int. Cl.
*G02F 1/1333* (2006.01)
*G02B 5/30* (2006.01)
(Continued)

(52) U.S. Cl.
CPC ............ *G02B 5/3025* (2013.01); *G02B 1/118* (2013.01); *G02B 27/0018* (2013.01);
(Continued)

(58) Field of Classification Search
CPC .. G02B 1/118; G02B 27/0018; G02B 5/3025; G02F 1/1335; G02F 1/133308;
(Continued)

(56) References Cited

U.S. PATENT DOCUMENTS

2004/0051827 A1 3/2004 Hinata et al.
2006/0159958 A1 7/2006 Lee
(Continued)

FOREIGN PATENT DOCUMENTS

JP 11-015392 A 1/1999
JP 2003-241175 A 8/2003
(Continued)

OTHER PUBLICATIONS

Official Communication issued in International Patent Application No. PCT/JP2015/066023, dated Aug. 11, 2015.

*Primary Examiner* — Charles S Chang
(74) *Attorney, Agent, or Firm* — Keating & Bennett, LLP

(57) ABSTRACT

The present invention provides a mirror display that enables simultaneous perception of a mirror image and an image with suppressed uncomfortable feeling. The mirror display of the present invention includes a half mirror plate including a half mirror layer, and a display device. The display device is disposed on the back surface side of the half mirror plate. The distance between a display surface of the display device and a display surface of the half mirror plate is not smaller than 100 mm. The half mirror layer preferably includes a reflective polarizer.

16 Claims, 21 Drawing Sheets

(51) Int. Cl.
 *G09F 19/16* (2006.01)
 *G02B 1/118* (2015.01)
 *G02B 27/00* (2006.01)
 *G02F 1/1335* (2006.01)
 *G09F 9/35* (2006.01)

(52) U.S. Cl.
 CPC ...... *G02F 1/1335* (2013.01); *G02F 1/133308* (2013.01); *G09F 9/35* (2013.01); *G09F 19/16* (2013.01); *G02F 1/133536* (2013.01); *G02F 2001/133562* (2013.01)

(58) Field of Classification Search
 CPC ... G02F 2001/133562; G02F 1/133536; G09F 19/16; G09F 9/35
 USPC .......................................................... 349/11
 See application file for complete search history.

(56) References Cited

U.S. PATENT DOCUMENTS

2008/0068520 A1\*  3/2008  Minikey, Jr. .............. B60R 1/12
  349/11
2008/0106705 A1\*  5/2008  Cortenraad .......... G02B 26/005
  353/98

FOREIGN PATENT DOCUMENTS

| JP | 2004-085590 A | 3/2004 |
| JP | 2004-125885 A | 4/2004 |
| JP | 2005-195824 A | 7/2005 |
| JP | 2006-201782 A | 8/2006 |
| JP | 2007-065314 A | 3/2007 |
| JP | 2011-045427 A | 3/2011 |
| JP | 2011-048000 A | 3/2011 |
| JP | 2014-052512 A | 3/2014 |
| WO | 2013/108363 A1 | 7/2013 |

\* cited by examiner

MIRROR DISPLAY AND MIRROR DISPLAY UNIT

TECHNICAL FIELD

The present invention relates to a mirror display and a mirror display unit. The present invention more specifically relates to a mirror display that functions both as a mirror and as a display providing images, and a mirror display unit including the mirror display.

BACKGROUND ART

Recently, mirror displays have been proposed for applications such as digital signage (e.g. Patent Literatures 1 to 4). A mirror display includes a half mirror plate provided on the front surface of a display device so that the display device can function as a mirror. The mirror display provides images owing to display light emitted from the display device and is also usable as a mirror by reflecting external light.

Known examples of an optical member with reflecting function include vapor-deposited metal films, dielectric multilayers, multilayer reflective polarizers, nano-wire grid polarizers (e.g. Patent Literatures 5 and 6), circularly-polarized light separating sheets utilizing selective reflection of cholesteric liquid crystals (e.g. Patent Literature 7).

CITATION LIST

Patent Literature

Patent Literature 1: JP 2004-125885 A
Patent Literature 2: JP 2003-241175 A
Patent Literature 3: JP H11-15392 A
Patent Literature 4: JP 2004-085590 A
Patent Literature 5: JP 2006-201782 A
Patent Literature 6: JP 2005-195824 A
Patent Literature 7: JP 2007-65314 A

SUMMARY OF INVENTION

Technical Problem

Unfortunately, in conventional mirror displays, a mirror image reflected by the mirror (hereinafter, also simply referred to as a mirror image) may fail to match an image displayed by the display device (hereinafter, also simply referred to as an image), which causes uncomfortable feeling. The reasons for this have been investigated by the inventors and are as follows.

FIG. 42 is a schematic view illustrating a relation between a mirror image and an image in a conventional mirror display. The following describes the case of virtual fitting of a pair of glasses using a liquid crystal display device as a display device.

As shown in FIG. 42, a mirror display 102 includes, in the order from the back surface side to the viewer side, a liquid crystal display device 103 and a half mirror plate 104. Here, when a viewer 108 standing at a position 1 m apart from the half mirror plate 104 sees the reflection of his/her own face in the mirror display 102, a mirror image M of his/her face is perceived at a position 2 m apart from the viewer 108. In other words, the mirror image M reflected by the half mirror plate 104 is perceived behind (on the back surface side of) the half mirror plate 104, not on the display surface of the half mirror plate 104. According to the optical theory, the mirror image M is shown in the mirror such that the mirror image M and the viewer 108 are symmetrical with respect to the display surface of the half mirror plate 104.

Meanwhile, when an image D of a pair of glasses is displayed on the liquid crystal display device 103 so as to place the virtual image of the glasses over the mirror image M, the image D of the glasses is perceived at a position 1 m apart from the viewer 108 (the thickness of the half mirror plate is ignored since it is relatively small). As a result, the mirror image M of the face of the viewer 108 and the image D of the glasses are perceived at positions with different depths. Thereby, the viewer 108 fails to simultaneously perceive his/her own face (the mirror image M) and the glasses (the image D) and thus feels an obvious uncomfortableness. This is because the focal point and convergence angle for viewing the mirror image M are significantly different from those for viewing the image D. Here, a convergence angle α refers to a convergence angle for viewing the mirror image M with eyes E1 and E2 of the viewer 108, and a convergence angle β refers to a convergence angle for viewing the image D with the eyes E1 and E2 of the viewer 108. The convergence angle α differs from the convergence angle β.

In order to solve the problem of such uncomfortable feeling, the inventors studied a method in which the viewer 108 stands very close to the mirror display 102 so that the mirror image M and the image D are perceived at the positions with the same depth. However, this method was found difficult for practical use in the case of virtual fitting of glasses or clothes, for example, because viewers would not stand as close as about several tens of millimeters from the mirror display.

As mentioned above, the uncomfortable feeling caused by the mirror image and the image has not been fully considered, and thus the solution for this problem has not been found. For example, Patent Literatures 1 to 4 include no disclosure focusing on such uncomfortable feeling and thus fail to solve the above problem.

The present invention was made under the current situation in the art and aims to provide a mirror display that enables simultaneous perception of the mirror image and the image with suppressed uncomfortable feeling, and a mirror display unit including the mirror display.

Solution to Problem

The inventors made intensive studies about a mirror display that enables simultaneous perception of the mirror image and the image with suppressed uncomfortable feeling, and focused on a structure in which a display device and a half mirror plate are placed more apart from each other than in conventional mirror displays.

Patent Literatures 1 to 4 fail to provide disclosure focusing on the distance between a display device and a half mirror plate. For example, Patent Literature 1 discloses a mobile phone as an embodiment. In this case, the distance between the display surface of the liquid crystal display device and the display surface of the half mirror plate is assumedly not more than about 10 mm. In many conventional mirror displays, the distance between the display surface of the display device and the display surface of the half mirror plate is more than zero due to the presence of interposed members constituting the half mirror plate, such as a base material (e.g. glass substrate), a bezel (housing) disposed on the surface of the display device, and an air layer. Even in such cases, the distance therebetween is about several millimeters to several tens of millimeters. Moreover, conventional mirror displays have been generally desired to have reduced size and thickness. Conventional mirror displays thus do not give a positive reason for increasing the distance between the display surface of the display device and the display surface of the half mirror plate.

In contrast, the inventors placed the display surface of the display device more apart from the display surface of the half mirror plate compared to conventional cases and thereby found that they could bring the mirror image and the image close to the positions with the same depth. This finding led them to a fine solution of the above problem and to completion of the present invention.

In other words, an aspect of the present invention may be a mirror display including a half mirror plate including a half mirror layer, and a display device, the display device being disposed on the back surface side of the half mirror plate, the distance between a display surface of the display device and a display surface of the half mirror plate being not smaller than 100 mm.

The inventors also found that a mirror display unit provided with the mirror display and a guiding member or length measurement sensor for indicating the position of the viewer can display a mirror image and an image at the positions with the same depth more accurately.

In other words, another aspect of the present invention may be a mirror display unit including the mirror display and a guiding member, the guiding member being disposed on the viewer side of the mirror display.

Still another aspect of the present invention may be a mirror display unit including the mirror display and a length measurement sensor, the length measurement sensor being configured to measure the distance between the display surface of the half mirror plate and a viewer.

Advantageous Effects of Invention

The present invention enables simultaneous perception of a mirror image and an image with suppressed uncomfortable feeling. Moreover, when the present invention is applied to virtual fitting of glasses or clothes, the viewer has no need to stand close to the mirror display, which can improve the practicability.

BRIEF DESCRIPTION OF DRAWINGS

FIG. 10(a) shows a case where the distance between the display surface of a liquid crystal display device and the display surface of a half mirror plate is small.
FIG. 10(b) shows a case where the distance between the display surface of a liquid crystal display device and the display surface of a half mirror plate is large.

DESCRIPTION OF EMBODIMENTS

Figure 1:
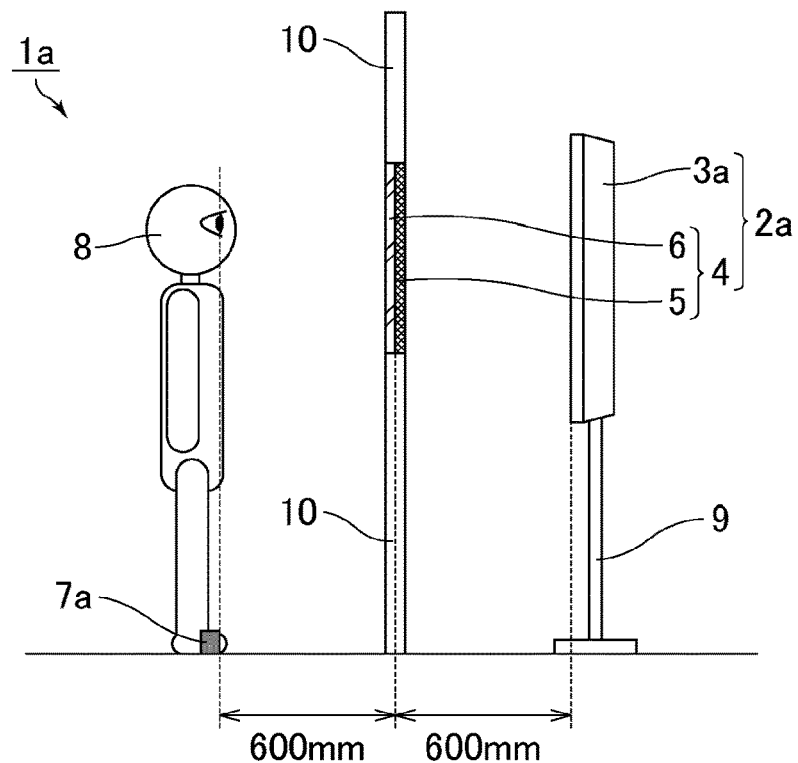
FIG. 1 is a schematic cross-sectional view of a mirror display unit of Example 1.

The present invention will be described in detail below by way of, but not limited to, the following examples referring to the drawings. The configurations of the respective examples may be employed in appropriate combination or may be modified as long as the combination or the modification is not beyond the spirit of the present invention.

Although the following examples describe the case where a liquid crystal display device is used as a display device, the kind of the display device is not particularly limited. Examples of the display device include a plasma display device, an organic electroluminescence display device, and an inorganic electroluminescence display device.

The term "half mirror layer" as used herein means a translucent layer with a property reflecting incident light. The half mirror layer has a reflectance for natural light of preferably 40% or more, more preferably 50% or more. The term "reflectance" as used herein refers to "luminous reflectance" unless otherwise noted. The half mirror layer may partly absorb incident light.

EXAMPLE 1

Example 1 relates to a mirror display unit including a mirror display that includes a liquid crystal display device and a reflective polarizer as a half mirror layer, and tape as a guiding member.

FIG. 1 is a schematic cross-sectional view of a mirror display unit of Example 1. As shown in FIG. 1, a mirror display unit 1a includes a mirror display 2a and tape 7a as a guiding member disposed on the viewer side of the mirror display 2a. The mirror display 2a includes, in the order from the back surface side to the viewer side, a liquid crystal display device 3a and a half mirror plate 4. The liquid crystal display device 3a was placed on a stand 9. The half mirror plate 4 was fixed by fitting in a hole in a wall 10. The liquid crystal display device 3a and the half mirror plate 4 may be placed or fixed by any method. The distance between the display surface of the liquid crystal display device 3a when viewed by a viewer 8 and the display surface of the half mirror plate 4 when viewed by the viewer 8 was 600 mm. The tape 7a was attached to the floor, in parallel with the display surface of the half mirror plate 4, at a position 600 mm apart from the viewer 8-side display surface of the half mirror plate 4 toward the viewer 8 side. When the viewer 8 stood at the position indicated by the tape 7a, the eyes of the viewer 8 and the tape 7a had substantially the same horizontal position.

The liquid crystal display device 3a used was a liquid crystal television (trade name: LC-20F5, Sharp Corporation) including a backlight, two absorptive polarizers disposed in a crossed-Nicols state, a liquid crystal display panel, and a bezel (not shown). The transmission axis of the back-surface-side absorptive polarizer was at an azimuth angle of 0° and the transmission axis of the viewer-side absorptive polarizer was at an azimuth angle of 90°, provided that the degree of azimuth angle is defined to be positive (+) in the counterclockwise direction starting from the long side of the liquid crystal display device 3a. The azimuth angles of the axes are described on the basis of the above definition hereinbelow. The viewer-side absorptive polarizer underwent no anti-reflection treatment but underwent an anti-glare (AG) treatment with a haze of 3.0% on the surface thereof. The display mode of the liquid crystal display panel was UV$^2$A. In the present example, the display surface of the liquid crystal display device 3a corresponds to the viewer-side surface of the viewer-side absorptive polarizer.

The half mirror plate 4 includes, in the order from the back surface side to the viewer side, a reflective polarizer 5 as a half mirror layer and a glass substrate 6 as a base material. The respective members were bonded to each other with an acrylic adhesive (not shown) in between. The half mirror plate 4 had about the same size as the display region of the liquid crystal display device 3a. In the present example, the display surface of the half mirror plate 4 corresponds to the viewer-side surface of the reflective polarizer 5.

The reflective polarizer 5 may be, for example, a multi-layer reflective polarizer, a nano-wire grid polarizer, and a reflective polarizer utilizing selective reflection of cholesteric liquid crystals. Examples of the multilayer reflective polarizer include a reflective polarizer (trade name: DBEF) available from Sumitomo 3M Ltd. Examples of the nano-wire grid polarizer include those disclosed in Patent Literatures 5 and 6. Examples of the reflective polarizer utilizing selective reflection of cholesteric liquid crystals include a reflective polarizer (trade name: PCF) available from Nitto Denko Corporation. In the present example, a multilayer reflective polarizer (trade name: DBEF) available from Sumitomo 3M Ltd. was used which has succeeded in mass production of a multilayer reflective polarizer with a large area at low cost. The reflective polarizer 5 was placed such that the transmission axis had an azimuth angle of 90°.

The half mirror layer may be any product as long as it has beam splitter function of partly reflecting and partly transmitting incident light. The reflective polarizer may be replaced by, for example, a vapor-deposited metal film or a dielectric multilayer. In order to achieve both of the visibility of the mirror image (reflected image) and the visibility of the image, the mirror display preferably has a structure including a liquid crystal display device and a reflective polarizer. In order to suppress the production cost, the reflective polarizer is better than the dielectric multilayer. The reflectance and the transmittance of the half mirror layer are not particularly limited, and may be flexibly adjusted by increasing or decreasing the thickness of the vapor-deposited metal film or dielectric multilayer, by stacking two or more reflective polarizers such that the respective transmission axes thereof are at different azimuth angles, or by employing two or more kinds of half mirror layers. The half mirror layer may have infrared absorption function and ultraviolet absorption function in addition to beam splitter function.

The glass substrate 6 had a thickness of 2.5 mm. The thickness of the glass substrate 6 is not limited to 2.5 mm and may be thinner or thicker than 2.5 mm. The glass substrate 6 is suitably made of tempered glass. The base material may be a transparent plate made of acrylic resin, for example, in place of the glass substrate 6.

The tape 7a functions as a mark (guiding member) indicating the position (viewing position) of the viewer 8. The guiding member is not particularly limited as long as it can indicate a position that is certain distance apart from the display surface of the half mirror plate 4, and examples thereof include a seat in addition to tape. The guiding member is preferably fixed on the floor or the like in order to sufficiently function as a guiding member.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1a has a configuration in which the distance between the display surface of the liquid crystal display device 3a and the display surface of the half mirror plate 4 is the same as the distance between the display surface of the half mirror plate 4 and the tape 7a (viewer 8), the focal point and convergence angle for viewing the mirror image can be made the same as those for viewing the image. Accordingly, the configuration of Example 1 enables simultaneous perception of the mirror image and the image without uncomfortable feeling.

EXAMPLE 2

Example 2 relates to a mirror display unit including a mirror display that includes a liquid crystal display device and a reflective polarizer as a half mirror layer, and tape as a guiding member. The difference from Example 1 is the arrangement of the liquid crystal display device and the half mirror plate. Since the mirror display unit of Example 2 is the same as the mirror display unit of Example 1 except for the above configuration, the description of the same respects is omitted here.

Figure 2:
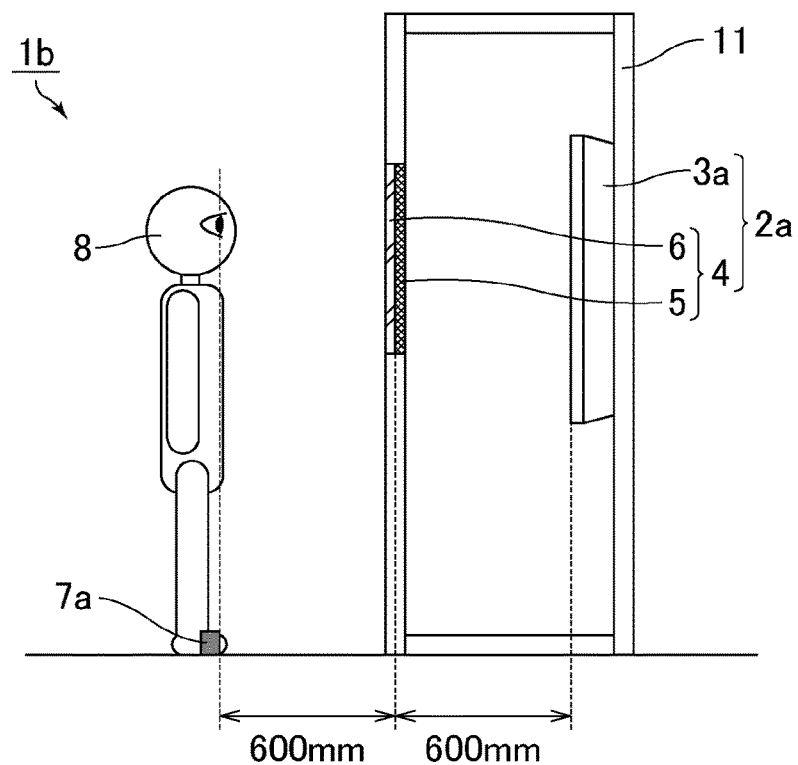
FIG. 2 is a schematic cross-sectional view of a mirror display unit of Example 2.

FIG. 2 is a schematic cross-sectional view of a mirror display unit of Example 2. As shown in FIG. 2, a mirror display unit 1b includes the mirror display 2a and the tape 7a as a guiding member disposed on the viewer side of the mirror display 2a. The mirror display 2a includes, in the order from the back surface side to the viewer side, the liquid crystal display device 3a and the half mirror plate 4. The liquid crystal display device 3a was fixed inside a box-shaped case 11. The half mirror plate 4 was fixed by fitting in a hole in the surface of the case 11.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1b has a configuration in which the distance between the display surface of the liquid crystal display device 3a and the display surface of the half mirror plate 4 is the same as the distance between the display surface of the half mirror plate 4 and the tape 7a (viewer 8), the focal point and convergence angle for viewing the mirror image can be made the same as those for viewing the image. Accordingly, the configuration of Example 2 enables simultaneous perception of the mirror image and the image without uncomfortable feeling.

EXAMPLE 3

Example 3 relates to a mirror display unit including a mirror display that includes a liquid crystal display device and a reflective polarizer as a half mirror layer, and a seat as a guiding member. The difference from Example 1 is use of the seat as a guiding member in addition to the tape. Since the mirror display unit of Example 3 is the same as the mirror display unit of Example 1 except for the above configuration, the description of the same respects is omitted here.

Figure 3:
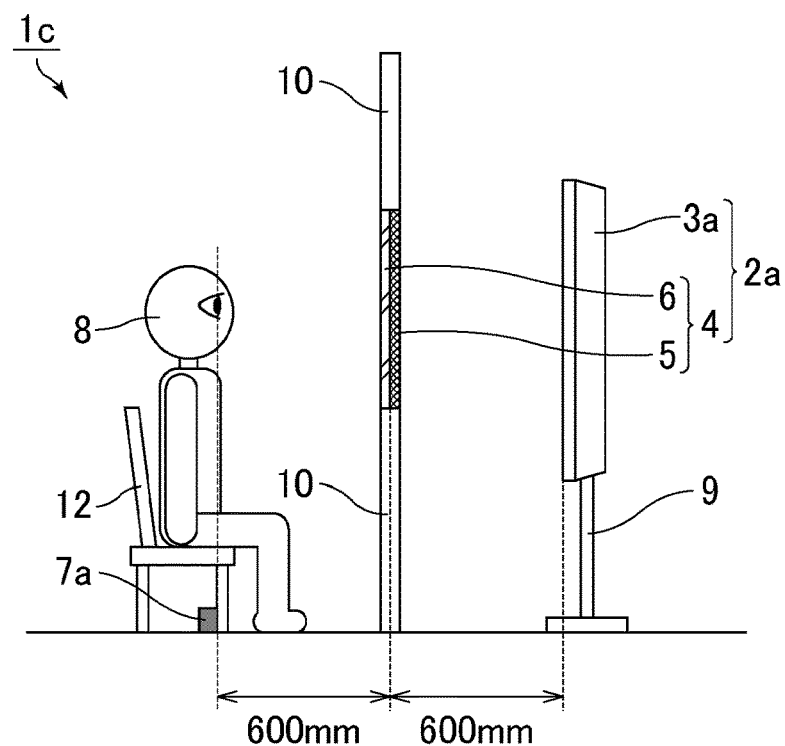
FIG. 3 is a schematic cross-sectional view of a mirror display unit of Example 3.

FIG. 3 is a schematic cross-sectional view of a mirror display unit of Example 3. As shown in FIG. 3, a mirror display unit 1c includes the mirror display 2a and the tape 7a and a seat 12 as guiding members disposed on the viewer side of the mirror display 2a. The mirror display 2a includes, in the order from the back surface side to the viewer side, the liquid crystal display device 3a and the half mirror plate 4. The position of the seat 12 was adjusted such that the eyes of the viewer 8 sitting on the seat 12 were 600 mm apart from the viewer 8-side display surface of the half mirror plate 4 toward the viewer 8 side. In the present example, the tape 7a was attached to the floor to function as a mark under the consideration that even if the seat 12 was out of the prescribed position, it could be easily brought back to the position. The tape 7a may be omitted by, for example, fixing the seat 12 on the floor. For example, an integrated mirror display unit may be employed in which the mirror display 2a and the seat 12 are integrally fixed at prescribed positions.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1c has a configuration in which the distance between the display surface of the liquid crystal display device 3a and the display surface of the half mirror plate 4 is the same as the distance between the display surface of the half mirror plate 4 and the seat 12 (viewer 8), the focal point and convergence angle for viewing the mirror image can be made the same as those for viewing the image. Accordingly, the configuration of Example 3 enables simultaneous perception of the mirror image and the image without uncomfortable feeling.

EXAMPLE 4

Example 4 relates to a mirror display unit including a mirror display that includes a liquid crystal display device and a reflective polarizer as a half mirror layer, and a seat as a guiding member. The difference from Example 2 is use of the seat as a guiding member in addition to the tape. Since the mirror display unit of Example 4 is the same as the mirror display unit of Example 2 except for the above configuration, the description of the same respects is omitted here.

Figure 4:
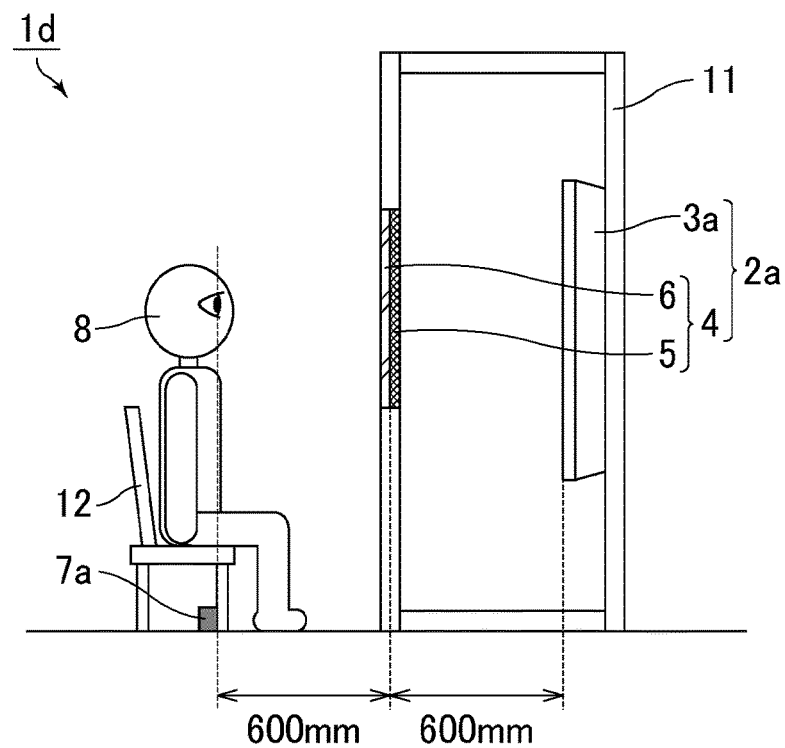
FIG. 4 is a schematic cross-sectional view of a mirror display unit of Example 4.

FIG. 4 is a schematic cross-sectional view of a mirror display unit of Example 4. As shown in FIG. 4, a mirror display unit 1d includes the mirror display 2a and the tape 7a and the seat 12 as guiding members disposed on the viewer side of the mirror display 2a. The mirror display 2a includes, in the order from the back surface side to the viewer side, the liquid crystal display device 3a and the half mirror plate 4. The position of the seat 12 was adjusted such that the eyes of the viewer 8 sitting on the seat 12 were 600 mm apart from the viewer 8-side display surface of the half mirror plate 4 toward the viewer 8 side. In the present example, the tape 7a was attached to the floor to function as a mark under the consideration that even if the seat 12 was out of the prescribed position, it could be easily brought back to the position.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1d has a configuration in which the distance between the display surface of the liquid crystal display device 3a and the display surface of the half mirror plate 4 is the same as the distance between the display surface of the half mirror plate 4 and the seat 12 (viewer 8), the focal point and convergence angle for viewing the mirror image can be made the same as those for viewing the image. Accordingly, the configuration of Example 4 enables simultaneous perception of the mirror image and the image without uncomfortable feeling.

EXAMPLE 5

Example 5 relates to a mirror display unit including a mirror display that includes a liquid crystal display device and a reflective polarizer as a half mirror layer, and tape as a guiding member. The difference from Example 1 is the distance between the display surface of the liquid crystal display device and the display surface of the half mirror plate and the distance between the display surface of the half mirror plate and the tape (viewer). Since the mirror display unit of Example 5 is the same as the mirror display unit of Example 1 except for the above configuration, the description of the same respects is omitted here.

Figure 5:
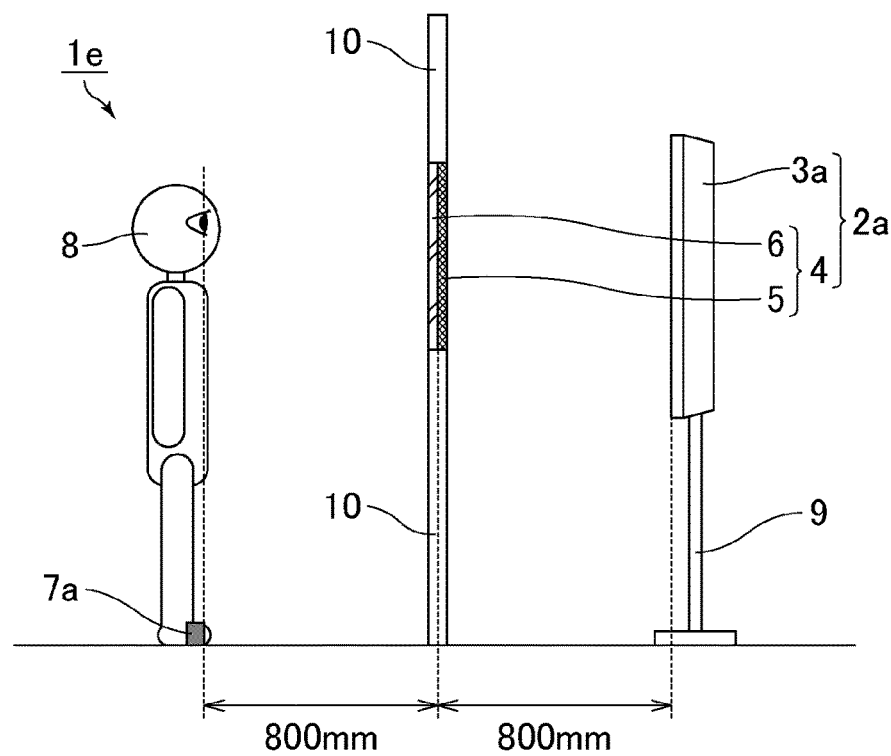
FIG. 5 is a schematic cross-sectional view of a mirror display unit of Example 5.

FIG. 5 is a schematic cross-sectional view of a mirror display unit of Example 5. As shown in FIG. 5, a mirror display unit 1e includes the mirror display 2a and the tape 7a as a guiding member disposed on the viewer side of the mirror display 2a. The mirror display 2a includes, in the order from the back surface side to the viewer side, the liquid crystal display device 3a and the half mirror plate 4. The distance between the viewer 8-side display surface of the liquid crystal display device 3a and the viewer 8-side display surface of the half mirror plate 4 was 800 mm. The tape 7a was attached to the floor, in parallel with the display surface of the half mirror plate 4, at a position 800 mm apart from the viewer 8-side display surface of the half mirror plate 4 toward the viewer 8 side.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1e has a configuration in which the distance between the display surface of the liquid crystal display device 3a and the display surface of the half mirror plate 4 is the same as the distance between the display surface of the half mirror plate 4 and the tape 7a (viewer 8), the focal point and convergence angle for viewing the mirror image can be made the same as those for viewing the image. Accordingly, the configuration of Example 5 enables simultaneous perception of the mirror image and the image without uncomfortable feeling.

EXAMPLE 6

Example 6 relates to a mirror display unit including a mirror display that includes a liquid crystal display device and a reflective polarizer as a half mirror layer, and tape as a guiding member. The difference from Example 2 is the distance between the display surface of the liquid crystal display device and the display surface of the half mirror plate and the distance between the display surface of the half mirror plate and the tape (viewer). Since the mirror display unit of Example 6 is the same as the mirror display unit of Example 2 except for the above configuration, the description of the same respects is omitted here.

Figure 6:
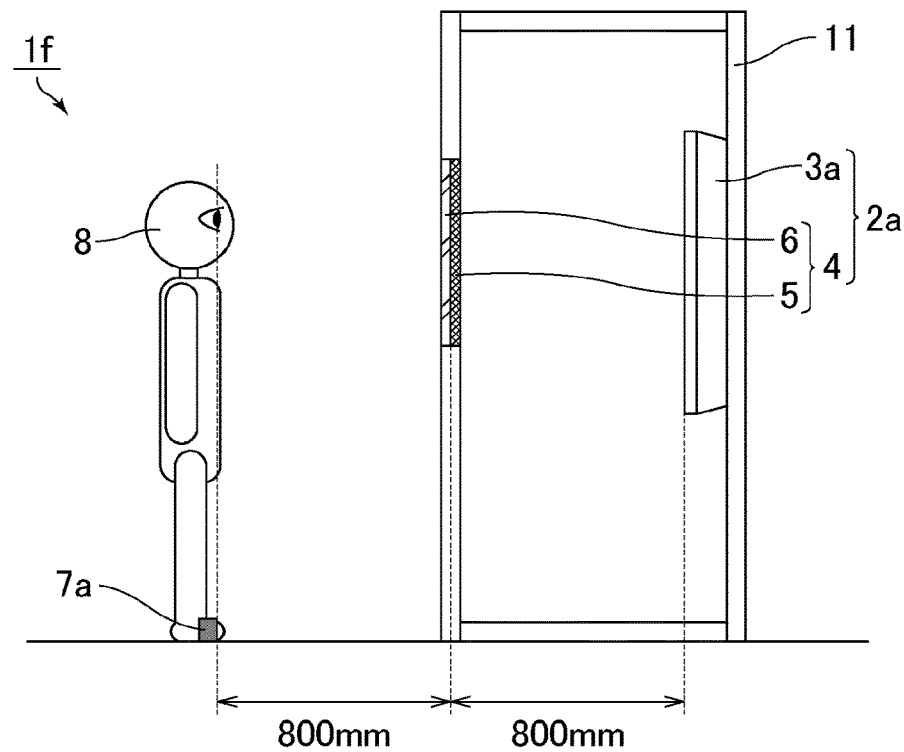
FIG. 6 is a schematic cross-sectional view of a mirror display unit of Example 6.

FIG. 6 is a schematic cross-sectional view of a mirror display unit of Example 6. As shown in FIG. 6, a mirror display unit 1f includes the mirror display 2a and the tape 7a as a guiding member disposed on the viewer side of the mirror display 2a. The mirror display 2a includes, in the order from the back surface side to the viewer side, the liquid crystal display device 3a and the half mirror plate 4. The distance between the viewer 8-side display surface of the liquid crystal display device 3a and the viewer 8-side display surface of the half mirror plate 4 was 800 mm. The tape 7a was attached to the floor, in parallel with the display surface of the half mirror plate 4, at a position 800 mm apart from the viewer 8-side display surface of the half mirror plate 4 toward the viewer 8 side.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1f has a configuration in which the distance between the display surface of the liquid crystal display device 3a and the display surface of the half mirror plate 4 is the same as the distance between the display surface of the half mirror plate 4 and the tape 7a (viewer 8), the focal point and convergence angle for viewing the mirror image can be made the same as those for viewing the image. Accordingly, the configuration of Example 6 enables simultaneous perception of the mirror image and the image without uncomfortable feeling.

EXAMPLE 7

Example 7 relates to a mirror display unit including a mirror display that includes a liquid crystal display device and a reflective polarizer as a half mirror layer, and a seat as a guiding member. The difference from Example 3 is the distance between the display surface of the liquid crystal display device and the display surface of the half mirror plate and the distance between the display surface of the half mirror plate and the seat (viewer). Since the mirror display unit of Example 7 is the same as the mirror display unit of Example 3 except for the above configuration, the description of the same respects is omitted here.

Figure 7:
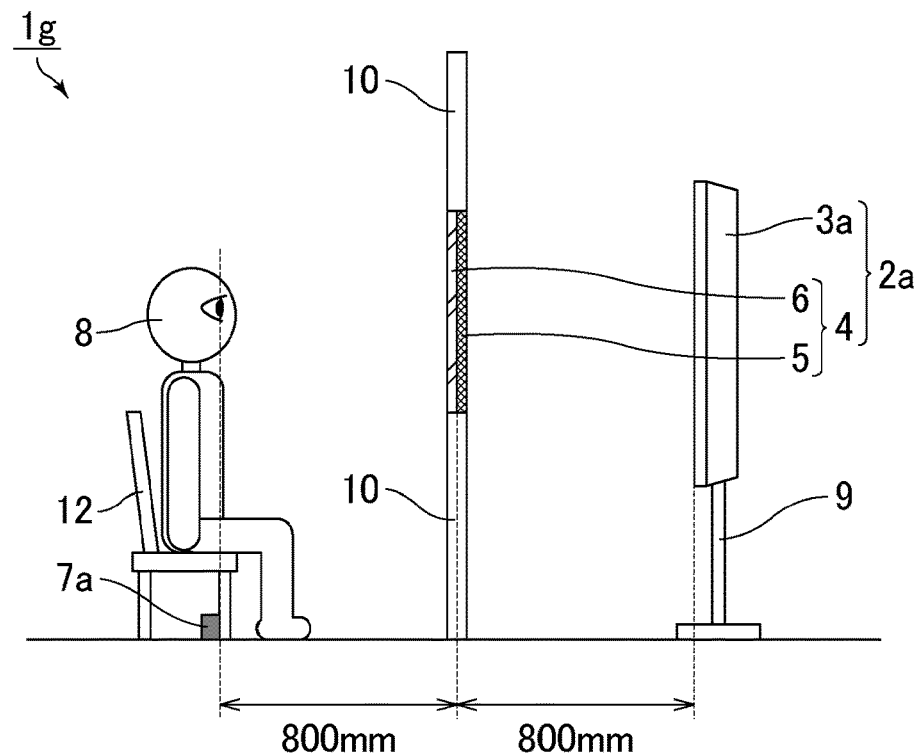
FIG. 7 is a schematic cross-sectional view of a mirror display unit of Example 7.

FIG. 7 is a schematic cross-sectional view of a mirror display unit of Example 7. As shown in FIG. 7, a mirror display unit 1g includes the mirror display 2a and the tape 7a and the seat 12 as guiding members disposed on the viewer side of the mirror display 2a. The mirror display 2a includes, in the order from the back surface side to the viewer side, the liquid crystal display device 3a and the half mirror plate 4. The distance between the viewer 8-side display surface of the liquid crystal display device 3a and the viewer 8-side display surface of the half mirror plate 4 was 800 mm. The position of the seat 12 was adjusted such that the eyes of the viewer 8 sitting on the seat 12 came to a position 800 mm apart from the viewer 8-side display surface of the half mirror plate 4 toward the viewer 8 side.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1g has a configuration in which the distance between the display surface of the liquid crystal display device 3a and the display surface of the half mirror plate 4 is the same as the distance between the display surface of the half mirror plate 4 and the seat 12 (viewer 8), the focal point and convergence angle for viewing the mirror image can be made the same as those for viewing the image. Accordingly, the configuration of Example 7 enables simultaneous perception of the mirror image and the image without uncomfortable feeling.

EXAMPLE 8

Example 8 relates to a mirror display unit including a mirror display that includes a liquid crystal display device and a reflective polarizer as a half mirror layer, and a seat as a guiding member. The difference from Example 4 is the distance between the display surface of the liquid crystal display device and the display surface of the half mirror plate and the distance between the display surface of the half mirror plate and the seat (viewer). Since the mirror display unit of Example 8 is the same as the mirror display unit of Example 4 except for the above configuration, the description of the same respects is omitted here.

Figure 8:
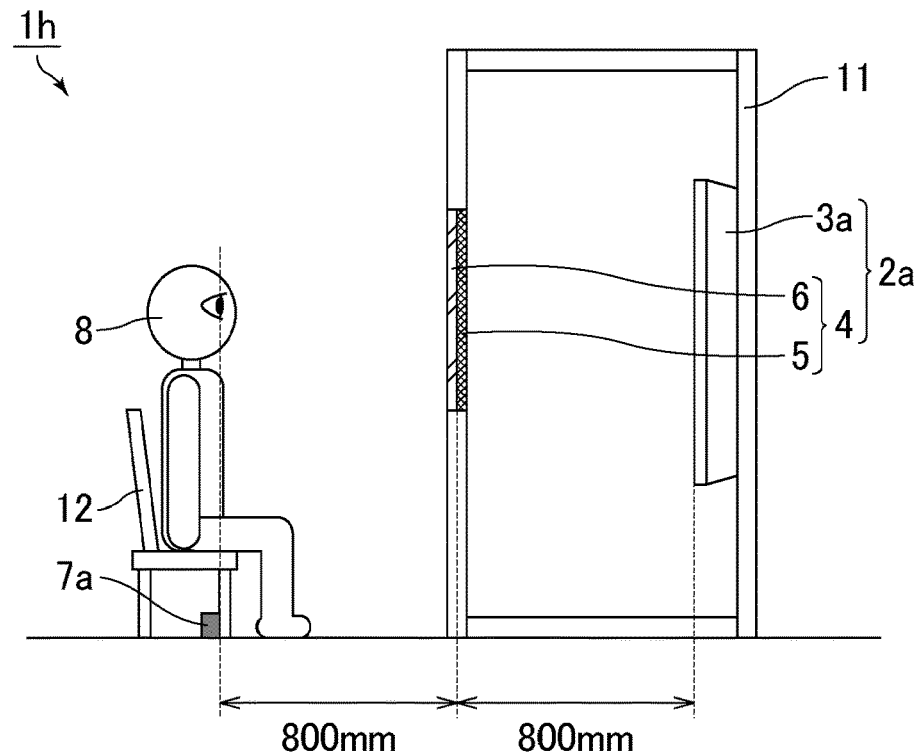
FIG. 8 is a schematic cross-sectional view of a mirror display unit of Example 8.

FIG. 8 is a schematic cross-sectional view of a mirror display unit of Example 8. As shown in FIG. 8, a mirror display unit 1h includes the mirror display 2a and the tape 7a and the seat 12 as guiding members disposed on the viewer side of the mirror display 2a. The mirror display 2a includes, in the order from the back surface side to the viewer side, the liquid crystal display device 3a and the half mirror plate 4. The distance between the viewer 8-side display surface of the liquid crystal display device 3a and the viewer 8-side display surface of the half mirror plate 4 was 800 mm. The position of the seat 12 was adjusted such that the eyes of the viewer 8 sitting on the seat 12 came to a position 800 mm apart from the viewer 8-side display surface of the half mirror plate 4 toward the viewer 8 side.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1h has a configuration in which the distance between the display surface of the liquid crystal display device 3a and the display surface of the half mirror plate 4 is the same as the distance between the display surface of the half mirror plate 4 and the seat 12 (viewer 8), the focal point and convergence angle for viewing the mirror image can be made the same as those for viewing the image. Accordingly, the configuration of Example 8 enables simultaneous perception of the mirror image and the image without uncomfortable feeling.

EXAMPLE 9

Example 9 relates to a mirror display unit including a mirror display that includes a liquid crystal display device and a reflective polarizer as a half mirror layer, and tape as a guiding member. The difference from Example 1 is provision of an antireflection film in the mirror display. Since the mirror display unit of Example 9 is the same as the mirror display unit of Example 1 except for the above configuration, the description of the same respects is omitted here.

Figure 9:
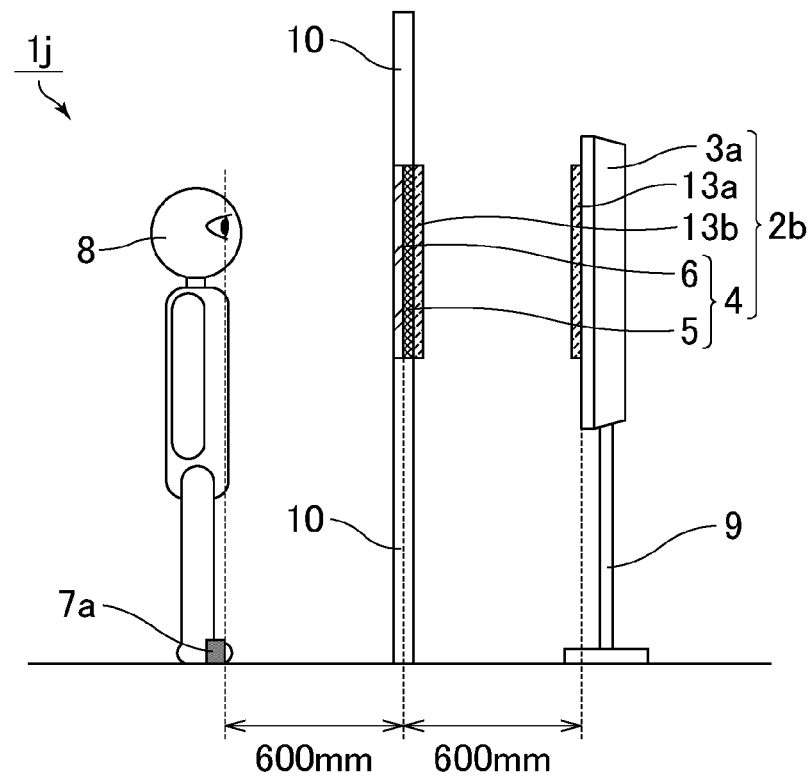
FIG. 9 is a schematic cross-sectional view of a mirror display unit of Example 9.

FIG. 9 is a schematic cross-sectional view of a mirror display unit of Example 9. As shown in FIG. 9, a mirror display unit 1j includes a mirror display 2b and the tape 7a as a guiding member disposed on the viewer side of the mirror display 2b. The mirror display 2b includes, in the order from the back surface side to the viewer side, the liquid crystal display device 3a, an antireflection film 13a, an antireflection film 13b, and the half mirror plate 4. The antireflection film 13a is bonded to the viewer-side surface of the liquid crystal display device 3a. The antireflection film 13b is bonded to the back-surface-side surface of the half mirror plate 4.

The antireflection film 13a used was an antireflection film having, on the viewer-side surface, an antireflection structure, i.e., a moth-eye structure (a structure like the eyes of a moth), with multiple protrusions disposed at a pitch not greater than the visible light wavelength. The antireflection film 13b used was an antireflection film having a moth-eye structure on the back-surface-side surface. Such a moth-eye structure enables remarkable reduction in reflected light owing to continuous variation in the refractive index for incident light from the air layer. The pitch between protrusions (the distance between the vertices of adjacent protrusions) constituting the moth-eye structure is not particularly limited as long as it is not greater than the visible light wavelength (e.g. 780 nm). The protrusions may have any shape such as a substantially conical shape. The protrusions may have any height. The protrusions are preferably made of resin in order to have such a configuration.

Examples of the antireflection film include those including a resin film or inorganic film having a monolayer or multilayer structure made of materials with different refractive indexes, in addition to the antireflection film having a moth-eye structure.

An example of the antireflection film including a resin film is an antireflection film (trade name: Fine Tiara) available from Panasonic Corporation. Another example of the antireflection film including a resin film is a laminated film including a low-refractive-index resin layer and a high-refractive-index resin layer. The two kinds of layers may be alternately laminated in layers according to need. A larger number of laminated layers decrease the reflectance, which improves the antireflection performance but raises cost. The low-refractive-index resin layer may be one prepared by thinly applying a fluorine-based resin, such as a low-refractive-index material (trade name: OPSTAR®) available from JSR Corporation, for example. The high-refractive-index resin layer may be one prepared by thinly applying a high-refractive-index coating liquid available from Sumitomo Osaka Cement Co., Ltd., for example.

Examples of the antireflection film including an inorganic film include an antireflection film available from Dexerials Corporation. In this case, a structure in which low-refractive-index films made of silicon dioxide ($SiO_2$) and high-refractive-index films made of niobium pentoxide ($Nb_2O_5$) are alternately laminated is often employed.

Since the mirror display 2b has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1j has a configuration in which the distance between the display surface of the liquid crystal display device 3a and the display surface of the half mirror plate 4 is the same as the distance between the display surface of the half mirror plate 4 and the tape 7a (viewer 8), the focal point and convergence angle for viewing the mirror image can be made the same as those for viewing the image. Accordingly, the configuration of Example 9 enables simultaneous perception of the mirror image and the image without uncomfortable feeling. The configuration of Example 9 can further achieve the following additional effect.

Figure 10:
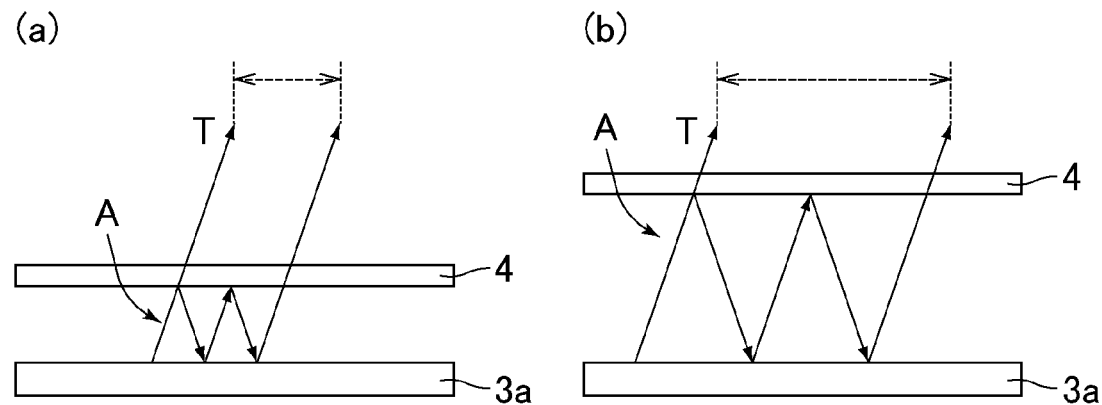
FIGS. 10(a) and 10(b) are conceptual diagrams for describing double vision.

Among the display light components emitted from a liquid crystal display device in a mirror display, a component that cannot pass through a half mirror plate (reflective polarizer) is reflected by the back surface side of the half mirror plate, which may cause repeating reflection between the liquid crystal display device and the half mirror plate. This may result in double vision of the display image. The problem of such double vision is more noticeable when the distance between the liquid crystal display device and the half mirror plate is larger. This phenomenon is described with reference to FIG. 10.

FIGS. 10(a) and 10(b) are conceptual diagrams for describing double vision. FIG. 10(a) shows a case where the distance between the display surface of a liquid crystal display device and the display surface of a half mirror plate is small. FIG. 10(b) shows a case where the distance between the display surface of a liquid crystal display device and the display surface of a half mirror plate is large. As shown in FIGS. 10(a) and 10(b), among the display light components emitted from the liquid crystal display device 3a, light components other than a transmitted light component T that has passed through the half mirror plate 4 are reflected by the back surface side of the half mirror plate 4, and are then repeatedly reflected between the liquid crystal display device 3a and the half mirror plate 4, which are referred to as multiple reflection components A. Here, FIGS. 10(a) and 10(b) describe the state that the display light components emitted from the liquid crystal display device 3a are incident obliquely on the half mirror plate 4. This is because the light emitted from the backlight of the liquid crystal display device 3a is generally diffusion light, and thus the display light emitted from the liquid crystal display device 3a may be incident obliquely on the half mirror plate 4. In such a case, a longer distance between the display surface of the liquid crystal display device 3a and the display surface of the half mirror plate 4 causes the multiple reflection components A to shift more apart from the initial position where the multiple reflection components A are initially emitted from the liquid crystal display device 3a. This phenomenon is easily understandable through comparison between the lengths of the arrows with broken lines in FIGS. 10(a) and 10(b). Accordingly, the problem of double vision becomes more noticeable as the distance between the display surface of the liquid crystal display device and the display surface of the half mirror plate increases. Consequently, in such a mirror display as in the present invention, in which the distance between the display surface of the liquid crystal display device 3a and the display surface of the half mirror plate 4 is intendedly increased, occurrence of more noticeable double vision is worried.

In contrast, the mirror display of Example 9, including the antireflection films 13a and 13b, can suppress the occurrence of the multiple reflection components A to prevent double vision. Also, as mentioned above, since the problem of double vision in the present invention is more noticeable, such improvement brings larger effects than in conventional mirror displays. Although providing at least one of the antireflection films 13a and 13b can suppress double vision, providing both of the antireflection films 13a and 13b is more preferred. In order to sufficiently suppress double vision, the antireflection film preferably has a moth-eye structure excellent in antireflection performance.

EXAMPLE 10

Example 10 relates to a mirror display unit including a mirror display that includes a liquid crystal display device and a reflective polarizer as a half mirror layer, and tape as a guiding member. The difference from Example 2 is provision of antireflection films in the mirror display. Since the mirror display unit of Example 10 is the same as the mirror display unit of Example 2 except for the above configuration, the description of the same respects is omitted here.

Figure 11:
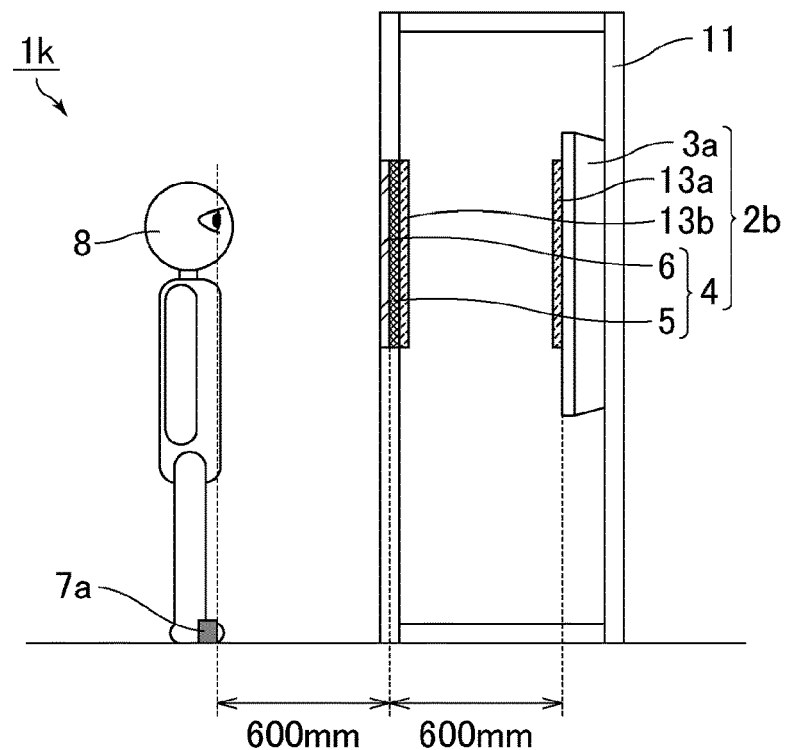
FIG. 11 is a schematic cross-sectional view of a mirror display unit of Example 10.

FIG. 11 is a schematic cross-sectional view of a mirror display unit of Example 10. As shown in FIG. 11, a mirror display unit 1k includes the mirror display 2b and the tape 7a as a guiding member disposed on the viewer side of the mirror display 2b. The mirror display 2b includes, in the order from the back surface side to the viewer side, the liquid crystal display device 3a, the antireflection film 13a, the antireflection film 13b, and the half mirror plate 4. The antireflection film 13a is bonded to the viewer-side surface of the liquid crystal display device 3a. The antireflection film 13b is bonded to the back-surface-side surface of the half mirror plate 4. The antireflection films 13a and 13b used were the same as those used in Example 9.

Since the mirror display 2b has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1k has a configuration in which the distance between the display surface of the liquid crystal display device 3a and the display surface of the half mirror plate 4 is the same as the distance between the display surface of the half mirror plate 4 and the tape 7a (viewer 8), the focal point and convergence angle for viewing the mirror image can be made the same as those for viewing the image. Accordingly, the configuration of Example 10 enables simultaneous perception of the mirror image and the image without uncomfortable feeling. The configuration of Example 10 can further achieve the same additional effect (prevention of double vision) as in Example 9.

EXAMPLE 11

Example 11 relates to a mirror display unit including a mirror display that includes a liquid crystal display device and a reflective polarizer as a half mirror layer, and a seat as a guiding member. The difference from Example 3 is provision of antireflection films in the mirror display. Since the mirror display unit of Example 11 is the same as the mirror display unit of Example 3 except for the above configuration, the description of the same respects is omitted here.

Figure 12:
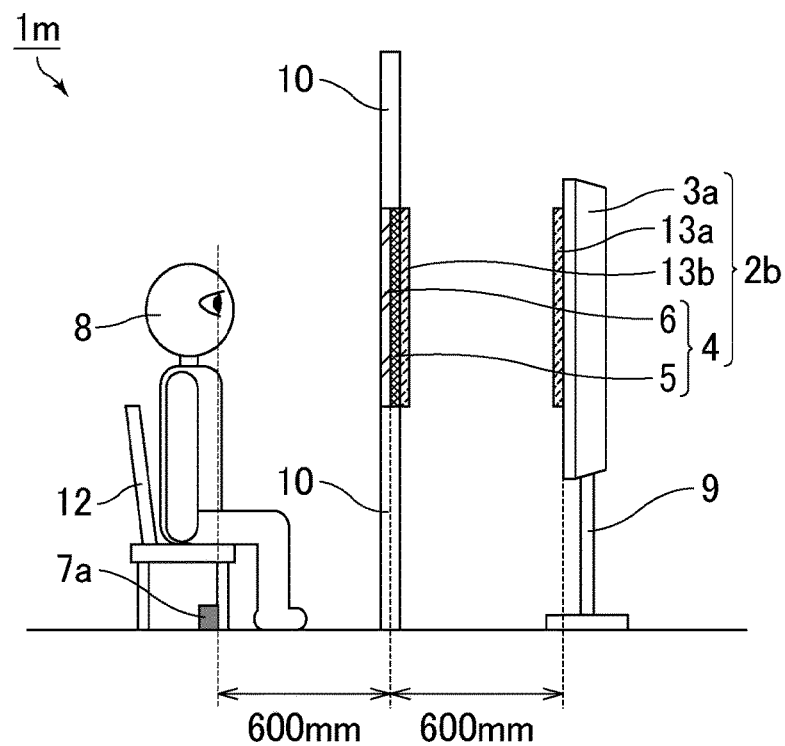
FIG. 12 is a schematic cross-sectional view of a mirror display unit of Example 11.

FIG. 12 is a schematic cross-sectional view of a mirror display unit of Example 11. As shown in FIG. 12, a mirror display unit 1m includes the mirror display 2b and the tape 7a and the seat 12 as guiding members disposed on the viewer side of the mirror display 2b. The mirror display 2b includes, in the order from the back surface side to the viewer side, the liquid crystal display device 3a, the antireflection film 13a, the antireflection film 13b, and the half mirror plate 4. The antireflection film 13a is bonded to the viewer-side surface of the liquid crystal display device 3a. The antireflection film 13b is bonded to the back-surface-side surface of the half mirror plate 4. The antireflection films 13a and 13b used were the same as those used in Example 9.

Since the mirror display 2b has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1m has a configuration in which the distance between the display surface of the liquid crystal display device 3a and the display surface of the half mirror plate 4 is the same as the distance between the display surface of the half mirror plate 4 and the seat 12 (viewer 8), the focal point and convergence angle for viewing the mirror image can be made the same as those for viewing the image. Accordingly, the configuration of Example 11 enables simultaneous perception of the mirror image and the image without uncomfortable feeling. The configuration of Example 11 can further achieve the same additional effect (prevention of double vision) as in Example 9.

EXAMPLE 12

Example 12 relates to a mirror display unit including a mirror display that includes a liquid crystal display device and a reflective polarizer as a half mirror layer, and a seat as a guiding member. The difference from Example 4 is provision of antireflection films in the mirror display. Since the mirror display unit of Example 12 is the same as the mirror display unit of Example 4 except for the above configuration, the description of the same respects is omitted here.

Figure 13:
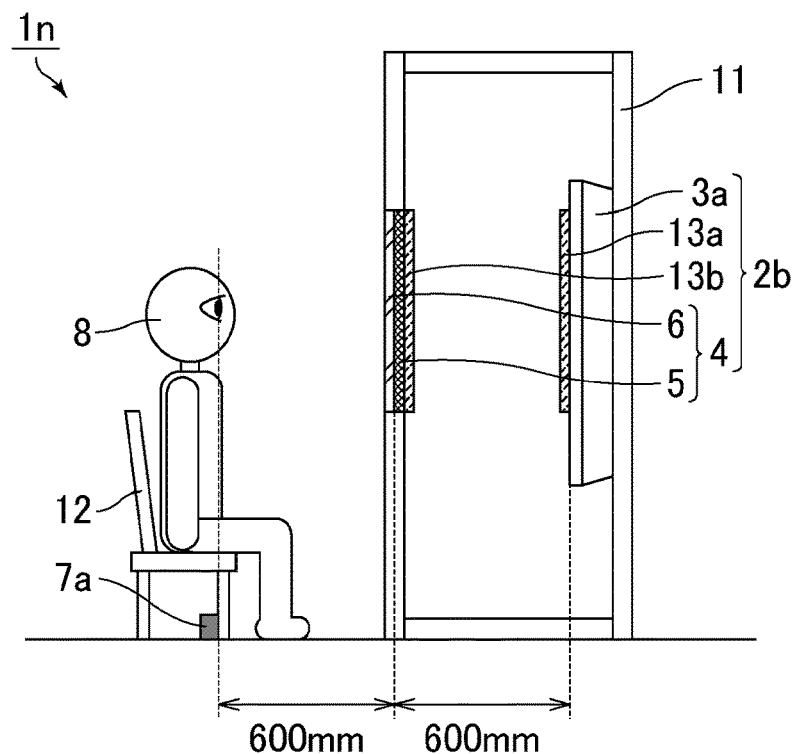
FIG. 13 is a schematic cross-sectional view of a mirror display unit of Example 12.

FIG. 13 is a schematic cross-sectional view of a mirror display unit of Example 12. As shown in FIG. 13, a mirror display unit 1n includes the mirror display 2b and the tape 7a and the seat 12 as guiding members disposed on the viewer side of the mirror display 2b. The mirror display 2b includes, in the order from the back surface side to the viewer side, the liquid crystal display device 3a, the antireflection film 13a, the antireflection film 13b, and the half mirror plate 4. The antireflection film 13a is bonded to the viewer-side surface of the liquid crystal display device 3a. The antireflection film 13b is bonded to the back-surface-side surface of the half mirror plate 4. The antireflection films 13a and 13b used were the same as those used in Example 9.

Since the mirror display 2b has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1n has a configuration in which the distance between the display surface of the liquid crystal display device 3a and the display surface of the half mirror plate 4 is the same as the distance between the display surface of the half mirror plate 4 and the seat 12 (viewer 8), the focal point and convergence angle for viewing the mirror image can be made the same as those for viewing the image. Accordingly, the configuration of Example 12 enables simultaneous perception of the mirror image and the image without uncomfortable feeling. The configuration of Example 12 can further achieve the same additional effect (prevention of double vision) as in Example 9.

EXAMPLE 13

Example 13 relates to a mirror display unit including a mirror display that includes a liquid crystal display device and a reflective polarizer as a half mirror layer, and tape as a guiding member. The difference from Example 1 is provision of a light-shielding material in the mirror display. Since the mirror display unit of Example 13 is the same as the mirror display unit of Example 1 except for the above configuration, the description of the same respects is omitted here.

Figure 14:
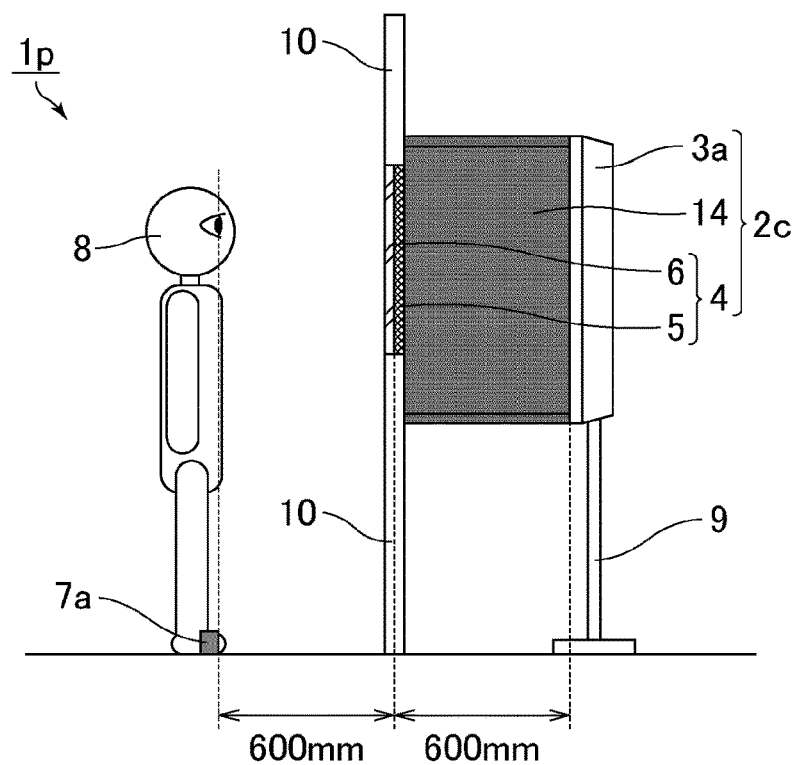
FIG. 14 is a schematic cross-sectional view of a mirror display unit of Example 13.

FIG. 14 is a schematic cross-sectional view of a mirror display unit of Example 13. As shown in FIG. 14, a mirror display unit 1p includes a mirror display 2c and the tape 7a as a guiding member disposed on the viewer side of the mirror display 2c. The mirror display 2c includes, in the order from the back surface side to the viewer side, the liquid crystal display device 3a, a light-shielding material 14, and the half mirror plate 4. The light-shielding material 14 is disposed such that it connects the liquid crystal display device 3a and the half mirror plate 4. This enables the viewer 8 to see the liquid crystal display device 3a through the half mirror plate 4.

The light-shielding material 14 used was a quadrangular prism-shaped light-shielding material consisting of four black acrylic plates and having apertures on the top and bottom surfaces. The light-shielding material 14 may have any shape as long as it has a hollow shape with apertures disposed on the viewer side and the back surface side, such as a cylindrical shape. The light-shielding material 14 may be made of any material, but is preferably made of a material with an optical transmittance of not higher than 15%.

Since the mirror display 2c has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1p has a configuration in which the distance between the display surface of the liquid crystal display device 3a and the display surface of the half mirror plate 4 is the same as the distance between the display surface of the half mirror plate 4 and the tape 7a (viewer 8), the focal point and convergence angle for viewing the mirror image can be made the same as those for viewing the image. Accordingly, the configuration of Example 13 enables simultaneous perception of the mirror image and the image without uncomfortable feeling. The configuration of Example 13 can further achieve the following additional effect.

In such a mirror display as in the present invention, in which the distance between the display surface of the liquid crystal display device 3a and the display surface of the half mirror plate 4 is intendedly increased, when a viewer views the mirror display from an oblique direction different from the normal direction, the regions (e.g. upper region of the liquid crystal display device 3a, stand 9) other than the display region of the liquid crystal display device 3a may be unfortunately visible through the half mirror plate 4, which causes deteriorated function both as a mirror and as a display.

In contrast, in the mirror display of Example 13 including the light-shielding material 14, even if a viewer views the mirror display from an oblique direction, the regions other than the display region of the liquid crystal display device 3a are less visible. The mirror display of Example 13 thus can achieve improved function both as a mirror and as a display and thereby can achieve a better viewing angle than the mirror displays of Examples 1 to 12. Also, in order to sufficiently achieve such an effect, a member that reduces the amount of incident light to less than 1/10 (transmittance of less than 10%) is preferably provided. As mentioned above, the half mirror layer (half mirror plate 4) has a reflectance of preferably 40% or more, namely, an optical transmittance of preferably not more than 60%. Here, if the optical transmittance of the light-shielding material 14 is not more than 15% (favorable optical transmittance) as mentioned above, the total optical transmittance of the half mirror plate 4 and light-shielding material 14 is 60%× 15%=not more than 9%. This can sufficiently achieve the effect in which the regions other than the display region of the liquid crystal display device 3*a* are less visible even if the viewer 8 tries to see the regions through the half mirror plate 4 and light-shielding material 14.

EXAMPLE 14

Example 14 relates to a mirror display unit including a mirror display that includes a liquid crystal display device and a reflective polarizer as a half mirror layer, and tape as a guiding member. The difference from Example 2 is provision of a light-shielding material in the mirror display. Since the mirror display unit of Example 14 is the same as the mirror display unit of Example 2 except for the above configuration, the description of the same respects is omitted here.

Figure 15:
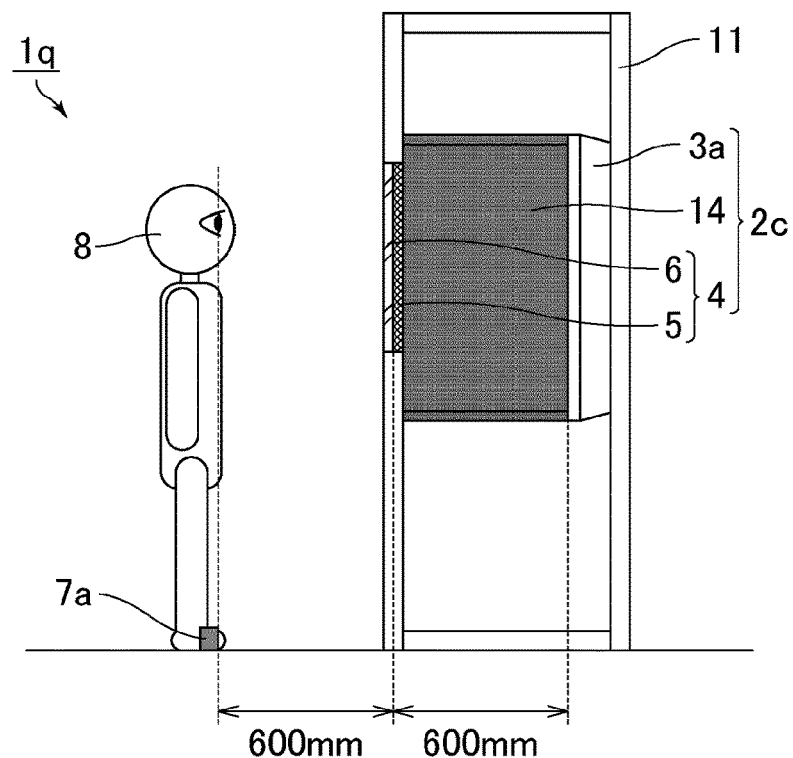
FIG. 15 is a schematic cross-sectional view of a mirror display unit of Example 14.

FIG. 15 is a schematic cross-sectional view of a mirror display unit of Example 14. As shown in FIG. 15, a mirror display unit 1*q* includes the mirror display 2*c* and the tape 7*a* as a guiding member disposed on the viewer side of the mirror display 2*c*. The mirror display 2*c* includes, in the order from the back surface side to the viewer side, the liquid crystal display device 3*a*, the light-shielding material 14, and the half mirror plate 4. The light-shielding material 14 is disposed such that it connects the liquid crystal display device 3*a* and the half mirror plate 4. The light-shielding material 14 used was the same as that used in Example 13.

Since the mirror display 2*c* has a configuration in which the display surface of the liquid crystal display device 3*a* and the display surface of the half mirror plate 4 are placed more apart from each other than in conventional mirror displays, the mirror image and the image can be brought close to the positions with the same depth. Moreover, since the mirror display unit 1*q* has a configuration in which the distance between the display surface of the liquid crystal display device 3*a* and the display surface of the half mirror plate 4 is the same as the distance between the display surface of the half mirror plate 4 and the tape 7*a* (viewer 8), the focal point and convergence angle for viewing the mirror image can be made the same as those for viewing the image. Accordingly, the configuration of Example 14 enables simultaneous perception of the mirror image and the image without uncomfortable feeling. The configuration of Example 14 can further achieve the same additional effect (improvement in viewing angle) as in Example 13.

EXAMPLE 15

Example 15 relates to a mirror display unit including a mirror display that includes a liquid crystal display device and a reflective polarizer as a half mirror layer, and a seat as a guiding member. The difference from Example 3 is provision of a light-shielding material in the mirror display. Since the mirror display unit of Example 15 is the same as the mirror display unit of Example 3 except for the above configuration, the description of the same respects is omitted here.

Figure 16:
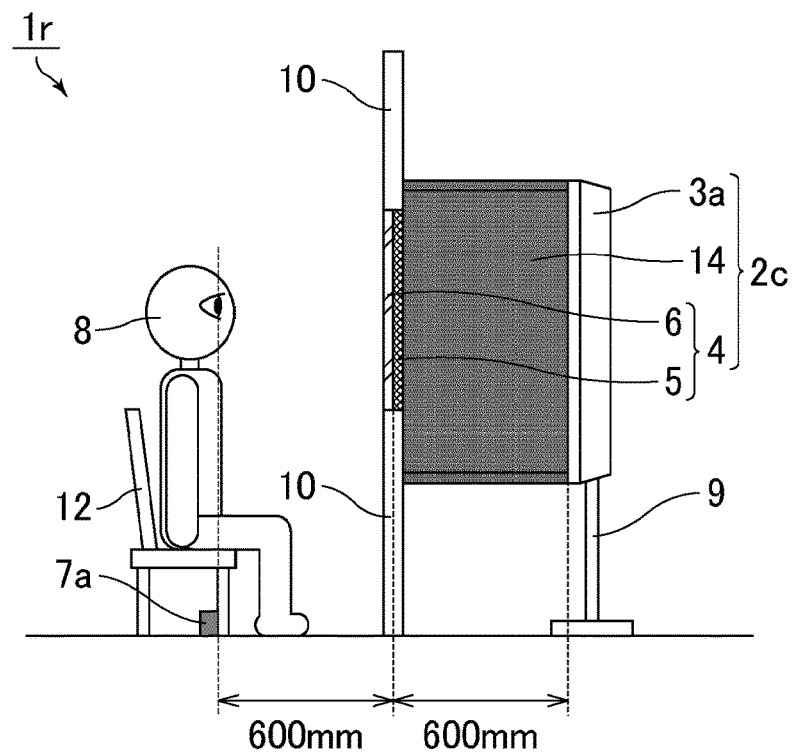
FIG. 16 is a schematic cross-sectional view of a mirror display unit of Example 15.

FIG. 16 is a schematic cross-sectional view of a mirror display unit of Example 15. As shown in FIG. 16, a mirror display unit 1*r* includes the mirror display 2*c* and the tape 7*a* and the seat 12 as guiding members disposed on the viewer side of the mirror display 2*c*. The mirror display 2*c* includes, in the order from the back surface side to the viewer side, the liquid crystal display device 3*a*, the light-shielding material 14, and the half mirror plate 4. The light-shielding material 14 is disposed such that it connects the liquid crystal display device 3*a* and the half mirror plate 4. The light-shielding material 14 used was the same as that used in Example 13.

Since the mirror display 2*c* has a configuration in which the display surface of the liquid crystal display device 3*a* and the display surface of the half mirror plate 4 are placed more apart from each other than in conventional mirror displays, the mirror image and the image can be brought close to the positions with the same depth. Moreover, since the mirror display unit 1*r* has a configuration in which the distance between the display surface of the liquid crystal display device 3*a* and the display surface of the half mirror plate 4 is the same as the distance between the display surface of the half mirror plate 4 and the seat 12 (viewer 8), the focal point and convergence angle for viewing the mirror image can be made the same as those for viewing the image. Accordingly, the configuration of Example 15 enables simultaneous perception of the mirror image and the image without uncomfortable feeling. The configuration of Example 15 can further achieve the same additional effect (improvement in viewing angle) as in Example 13.

EXAMPLE 16

Example 16 relates to a mirror display unit including a mirror display that includes a liquid crystal display device and a reflective polarizer as a half mirror layer, and a seat as a guiding member. The difference from Example 4 is provision of a light-shielding material in the mirror display. Since the mirror display unit of Example 16 is the same as the mirror display unit of Example 4 except for the above configuration, the description of the same respects is omitted here.

Figure 17:
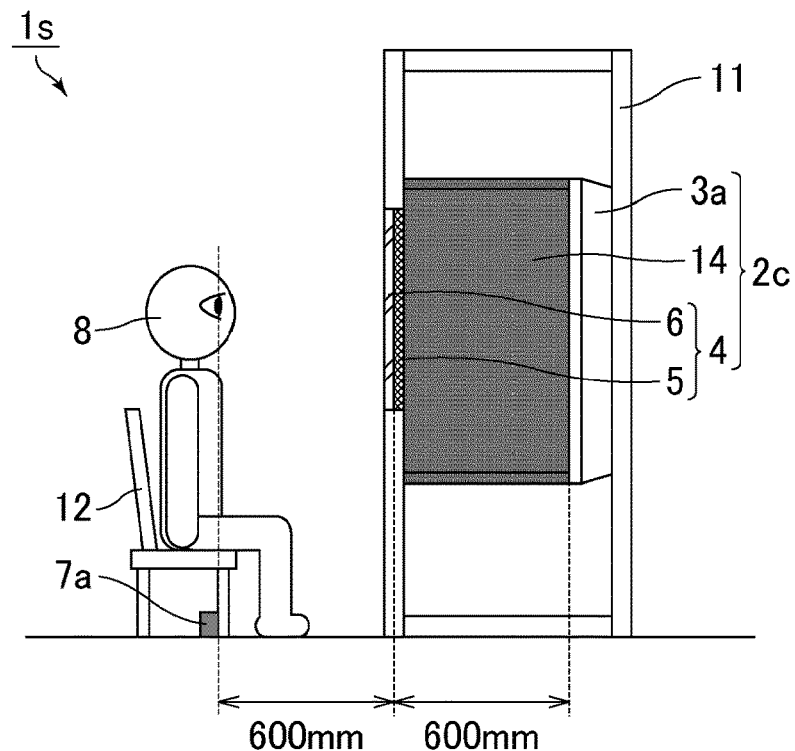
FIG. 17 is a schematic cross-sectional view of a mirror display unit of Example 16.

FIG. 17 is a schematic cross-sectional view of a mirror display unit of Example 16. As shown in FIG. 17, a mirror display unit 1*s* includes the mirror display 2*c* and the tape 7*a* and the seat 12 as guiding members disposed on the viewer side of the mirror display 2*c*. The mirror display 2*c* includes, in the order from the back surface side to the viewer side, the liquid crystal display device 3*a*, the light-shielding material 14, and the half mirror plate 4. The light-shielding material 14 is disposed such that it connects the liquid crystal display device 3*a* and the half mirror plate 4. The light-shielding material 14 used was the same as that used in Example 13.

Since the mirror display 2*c* has a configuration in which the display surface of the liquid crystal display device 3*a* and the display surface of the half mirror plate 4 are placed more apart from each other than in conventional mirror displays, the mirror image and the image can be brought close to the positions with the same depth. Moreover, since the mirror display unit 1*s* has a configuration in which the distance between the display surface of the liquid crystal display device 3*a* and the display surface of the half mirror plate 4 is the same as the distance between the display surface of the half mirror plate 4 and the seat 12 (viewer 8), the focal point and convergence angle for viewing the mirror image can be made the same as those for viewing the image. Accordingly, the configuration of Example 16 enables simultaneous perception of the mirror image and the image without uncomfortable feeling. The configuration of Example 16 can further achieve the same additional effect (improvement in viewing angle) as in Example 13.

EXAMPLE 17

Example 17 relates to a mirror display unit including a mirror display that includes a liquid crystal display device and a reflective polarizer as a half mirror layer, and tape as a guiding member. The difference from Example 1 is the size of the display region of the liquid crystal display device which is larger than the size of the half mirror plate. Since the mirror display unit of Example 17 is the same as the mirror display unit of Example 1 except for the above configuration, the description of the same respects is omitted here.

Figure 18:
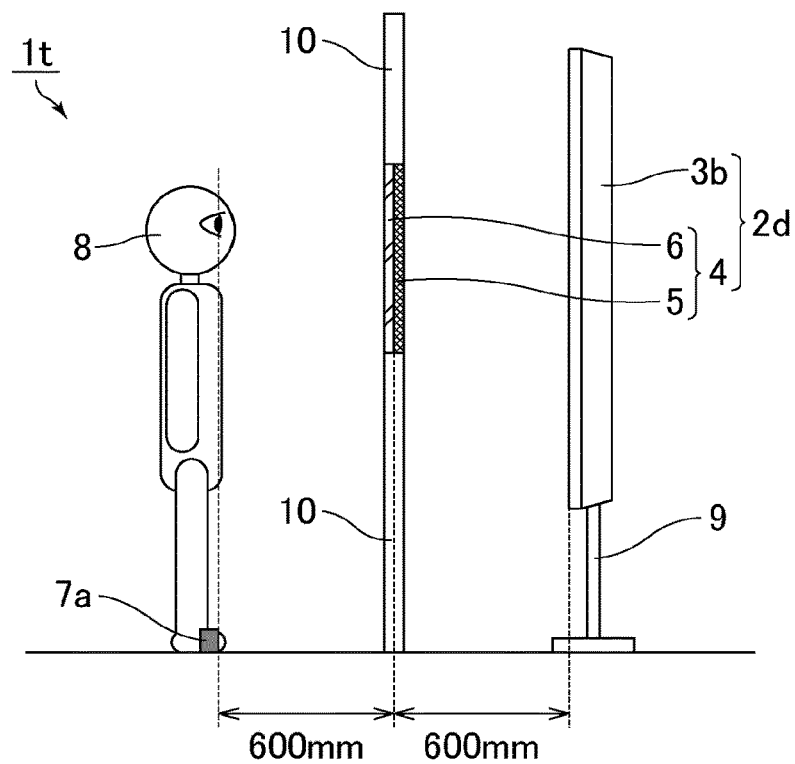
FIG. 18 is a schematic cross-sectional view of a mirror display unit of Example 17.

FIG. 18 is a schematic cross-sectional view of a mirror display unit of Example 17. As shown in FIG. 18, a mirror display unit 1t includes a mirror display 2d and the tape 7a as a guiding member disposed on the viewer side of the mirror display 2d. The mirror display 2d includes, in the order from the back surface side to the viewer side, a liquid crystal display device 3b and the half mirror plate 4. The size of the display region of the liquid crystal display device 3b was made larger than the size of the half mirror plate 4.

The liquid crystal display device 3b used was a liquid crystal television (trade name: LC-40F5, Sharp Corporation) including a backlight, two absorptive polarizers disposed in a crossed-Nicols state, a liquid crystal display panel, and a bezel (not shown). The liquid crystal display device 3b had the same configuration (e.g. the axis angles of the absorptive polarizers, display mode) as the liquid crystal display device 3a except that the length of the diagonal of the display region was increased from about 20 inches to about 40 inches. In the present example, the display surface of the liquid crystal display device 3b corresponds to the viewer-side surface of the viewer-side absorptive polarizer.

Since the mirror display 2d has a configuration in which the display surface of the liquid crystal display device 3b and the display surface of the half mirror plate 4 are placed more apart from each other than in conventional mirror displays, the mirror image and the image can be brought close to the positions with the same depth. Moreover, since the mirror display unit 1t has a configuration in which the distance between the display surface of the liquid crystal display device 3b and the display surface of the half mirror plate 4 is the same as the distance between the display surface of the half mirror plate 4 and the tape 7a (viewer 8), the focal point and convergence angle for viewing the mirror image can be made the same as those for viewing the image. Accordingly, the configuration of Example 17 enables simultaneous perception of the mirror image and the image without uncomfortable feeling. The configuration of Example 17 can further achieve the following additional effect.

In such a mirror display as in the present invention, in which the distance between the display surface of the liquid crystal display device 3a and the display surface of the half mirror plate 4 is intendedly increased, when a viewer views the mirror display from an oblique direction different from the normal direction, the regions (e.g. upper region of the liquid crystal display device 3a, stand 9) other than the display region of the liquid crystal display device 3a may be unfortunately visible through the half mirror plate 4, as already described above.

In contrast, in the mirror display of Example 17, which includes the liquid crystal display device 3b including a larger display region than the liquid crystal display device 3a, even when the mirror display is viewed from an oblique direction, the mirror and display can exhibit improved function and can achieve an improved viewing angle compared to the mirror displays of Examples 1 to 12. For a further improved viewing angle, the light-shielding material 14 used in the mirror displays of Examples 13 to 16 may be used in combination.

EXAMPLE 18

Example 18 relates to a mirror display unit including a mirror display that includes a liquid crystal display device and a reflective polarizer as a half mirror layer, and tape as a guiding member. The difference from Example 2 is the size of the display region of the liquid crystal display device which is larger than the size of the half mirror plate. Since the mirror display unit of Example 18 is the same as the mirror display unit of Example 2 except for the above configuration, the description of the same respects is omitted here.

Figure 19:
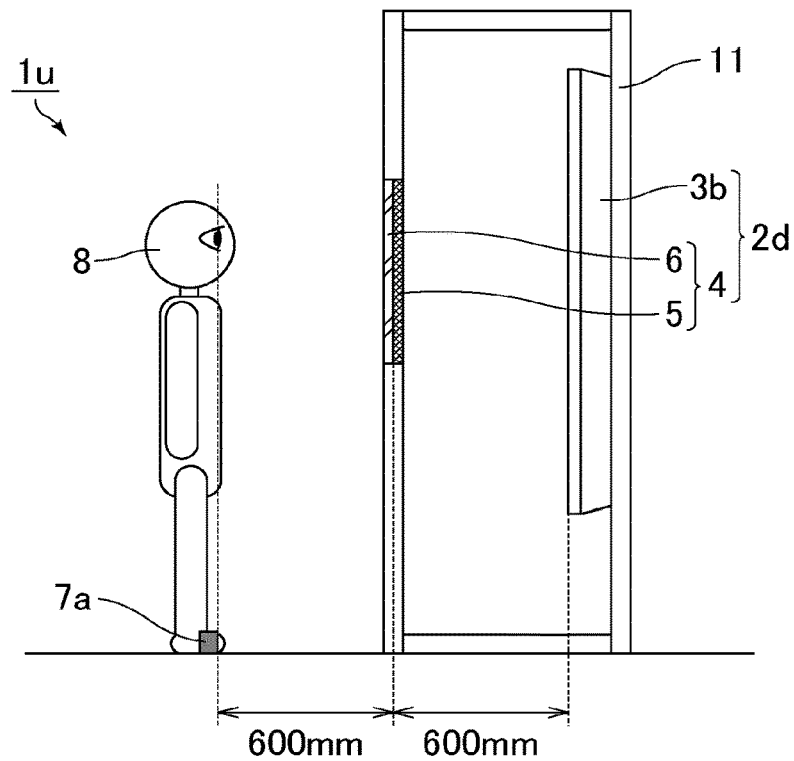
FIG. 19 is a schematic cross-sectional view of a mirror display unit of Example 18.

FIG. 19 is a schematic cross-sectional view of a mirror display unit of Example 18. As shown in FIG. 19, a mirror display unit 1u includes the mirror display 2d and the tape 7a as a guiding member disposed on the viewer side of the mirror display 2d. The mirror display 2d includes, in the order from the back surface side to the viewer side, the liquid crystal display device 3b and the half mirror plate 4. The size of the display region of the liquid crystal display device 3b was made larger than the size of the half mirror plate 4. The liquid crystal display device 3b used was the same as that used in Example 17.

Since the mirror display 2d has a configuration in which the display surface of the liquid crystal display device 3b and the display surface of the half mirror plate 4 are placed more apart from each other than in conventional mirror displays, the mirror image and the image can be brought close to the positions with the same depth. Moreover, since the mirror display unit 1u has a configuration in which the distance between the display surface of the liquid crystal display device 3b and the display surface of the half mirror plate 4 is the same as the distance between the display surface of the half mirror plate 4 and the tape 7a (viewer 8), the focal point and convergence angle for viewing the mirror image can be made the same as those for viewing the image. Accordingly, the configuration of Example 18 enables simultaneous perception of the mirror image and the image without uncomfortable feeling. The configuration of Example 18 can further achieve the same additional effect (improvement in viewing angle) as in Example 17.

EXAMPLE 19

Example 19 relates to a mirror display unit including a mirror display that includes a liquid crystal display device and a reflective polarizer as a half mirror layer, and a seat as a guiding member. The difference from Example 3 is the size of the display region of the liquid crystal display device which is larger than the size of the half mirror plate. Since the mirror display unit of Example 19 is the same as the mirror display unit of Example 3 except for the above configuration, the description of the same respects is omitted here.

Figure 20:
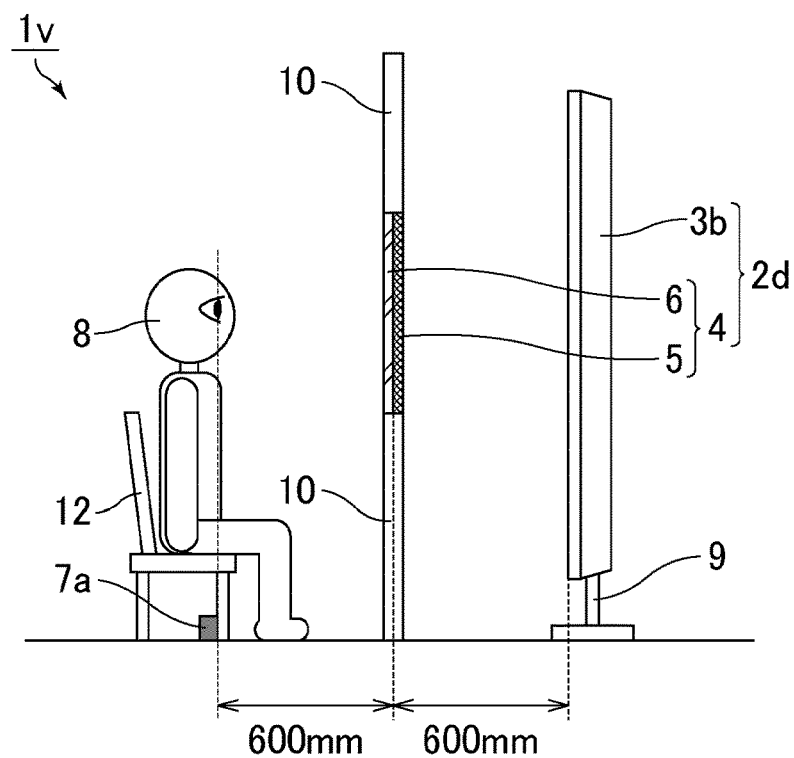
FIG. 20 is a schematic cross-sectional view of a mirror display unit of Example 19.

FIG. 20 is a schematic cross-sectional view of a mirror display unit of Example 19. As shown in FIG. 20, a mirror display unit 1v includes the mirror display 2d and the tape 7a and the seat 12 as guiding members disposed on the viewer side of the mirror display 2d. The mirror display 2d includes, in the order from the back surface side to the viewer side, the liquid crystal display device 3b and the half mirror plate 4. The size of the display region of the liquid crystal display device 3b was made larger than the size of the half mirror plate 4. The liquid crystal display device 3b used was the same as that used in Example 17.

Since the mirror display 2d has a configuration in which the display surface of the liquid crystal display device 3b and the display surface of the half mirror plate 4 are placed more apart from each other than in conventional mirror displays, the mirror image and the image can be brought close to the positions with the same depth. Moreover, since the mirror display unit 1v has a configuration in which the distance between the display surface of the liquid crystal display device 3b and the display surface of the half mirror plate 4 is the same as the distance between the display surface of the half mirror plate 4 and the seat 12 (viewer 8), the focal point and convergence angle for viewing the mirror image can be made the same as those for viewing the image. Accordingly, the configuration of Example 19 enables simultaneous perception of the mirror image and the image without uncomfortable feeling. The configuration of Example 19 can further achieve the same additional effect (improvement in viewing angle) as in Example 17.

EXAMPLE 20

Example 20 relates to a mirror display unit including a mirror display that includes a liquid crystal display device and a reflective polarizer as a half mirror layer, and a seat as a guiding member. The difference from Example 4 is the size of the display region of the liquid crystal display device which is larger than the size of the half mirror plate. Since the mirror display unit of Example 20 is the same as the mirror display unit of Example 4 except for the above configuration, the description of the same respects is omitted here.

Figure 21:
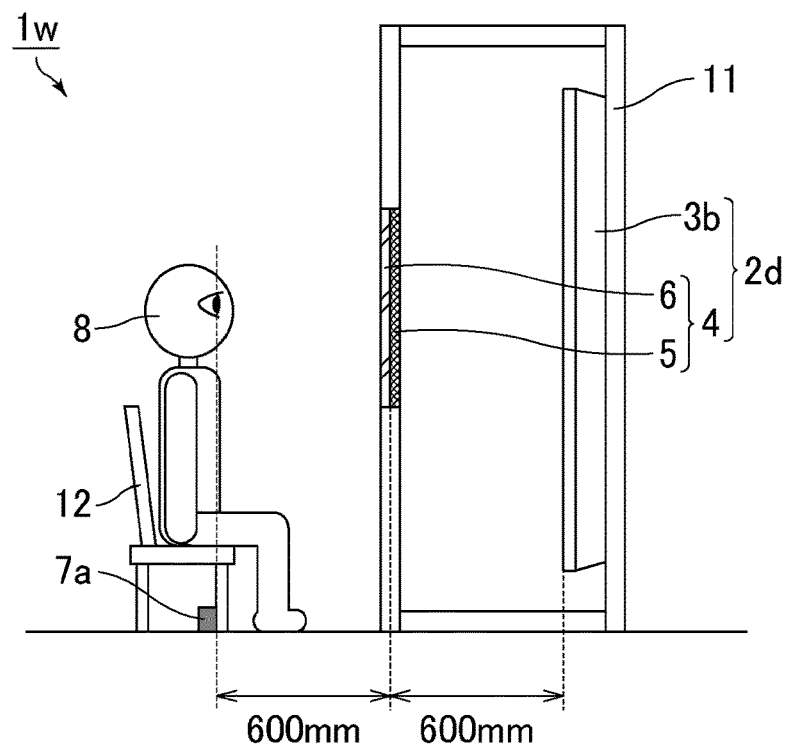
FIG. 21 is a schematic cross-sectional view of a mirror display unit of Example 20.

FIG. 21 is a schematic cross-sectional view of a mirror display unit of Example 20. As shown in FIG. 21, a mirror display unit 1w includes the mirror display 2d and the tape 7a and the seat 12 as guiding members disposed on the viewer side of the mirror display 2d. The mirror display 2d includes, in the order from the back surface side to the viewer side, the liquid crystal display device 3b and the half mirror plate 4. The size of the display region of the liquid crystal display device 3b was made larger than the size of the half mirror plate 4. The liquid crystal display device 3b used was the same as that used in Example 17.

Since the mirror display 2d has a configuration in which the display surface of the liquid crystal display device 3b and the display surface of the half mirror plate 4 are placed more apart from each other than in conventional mirror displays, the mirror image and the image can be brought close to the positions with the same depth. Moreover, since the mirror display unit 1w has a configuration in which the distance between the display surface of the liquid crystal display device 3b and the display surface of the half mirror plate 4 is the same as the distance between the display surface of the half mirror plate 4 and the seat 12 (viewer 8), the focal point and convergence angle for viewing the mirror image can be made the same as those for viewing the image. Accordingly, the configuration of Example 20 enables simultaneous perception of the mirror image and the image without uncomfortable feeling. The configuration of Example 20 can further achieve the same additional effect (improvement in viewing angle) as in Example 17.

EXAMPLE 21

Example 21 relates to a mirror display unit including a mirror display that includes a liquid crystal display device and a reflective polarizer as a half mirror layer, and tape as a guiding member. The difference from Example 1 is provision of a positioning mechanism that flexibly adjusts the distance between the display surface of the liquid crystal display device and the display surface of the half mirror plate, and a modification in the guiding member for easy measurement of the distance between the display surface of the half mirror plate and the viewer. Since the mirror display unit of Example 21 is the same as the mirror display unit of Example 1 except for the above configuration, the description of the same respects is omitted here.

Figure 22:
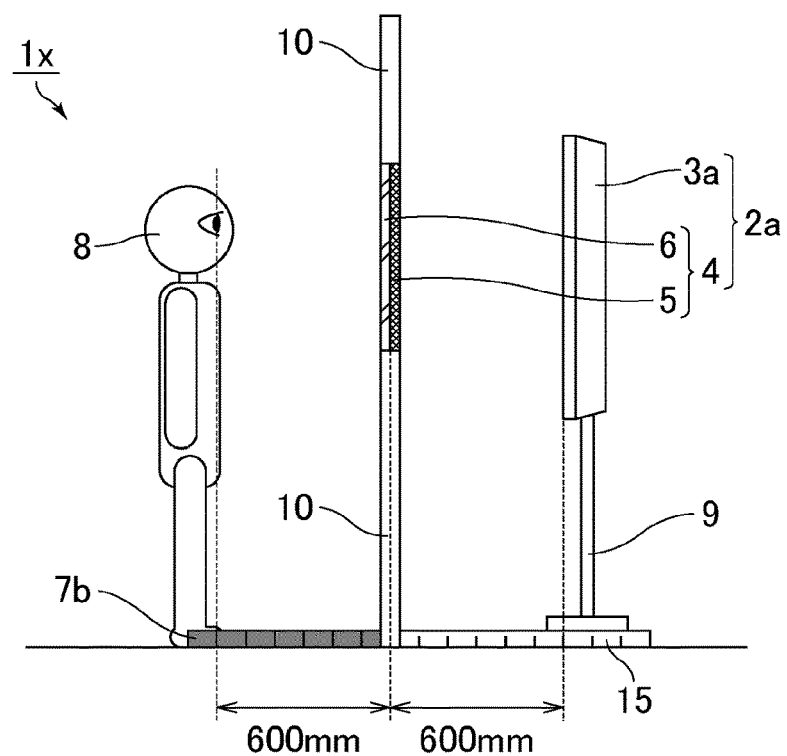
FIG. 22 is a schematic cross-sectional view of a mirror display unit of Example 21.

FIG. 22 is a schematic cross-sectional view of a mirror display unit of Example 21. As shown in FIG. 22, a mirror display unit 1x includes the mirror display 2a, tape 7b as a guiding member disposed on the viewer side of the mirror display 2a, and a rail 15 as a positioning mechanism. The mirror display 2a includes, in the order from the back surface side to the viewer side, the liquid crystal display device 3a and the half mirror plate 4. The liquid crystal display device 3a was placed on the stand 9 with wheels and mounted on the rail 15.

The tape 7b used was tape marked in 100 mm increments and attached to the floor. This enables easy measurement of the distance between the display surface of the half mirror plate 4 and the viewer 8. In the present example, the distance between the display surface of the half mirror plate 4 and the viewer 8 was 600 mm. The distance between the display surface of the half mirror plate 4 and the viewer 8 may be measured by any means such as a length measurement sensor in place of the tape with markings.

The rail 15 used was a metal rail marked in 100 mm increments and placed on the floor. This enables flexible adjustment of the distance between the display surface of the liquid crystal display device 3a and the display surface of the half mirror plate 4 according to the distance between the display surface of the half mirror plate 4 and the viewer 8. In this case, the liquid crystal display device 3a integrated with the stand 9 may be manually moved along the rail 15 or may be automatically (e.g. electrically) moved. The distance between the display surface of the liquid crystal display device 3a and the display surface of the half mirror plate 4 may be adjusted by any method. In the present example, the distance between the display surface of the liquid crystal display device 3a and the display surface of the half mirror plate 4 was 600 mm.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1x has a configuration in which the distance between the display surface of the liquid crystal display device 3a and the display surface of the half mirror plate 4 is capable of being adjusted to be the same as the distance between the display surface of the half mirror plate 4 and the viewer 8, the focal point and convergence angle for viewing the mirror image can be made the same as those for viewing the image. Accordingly, the configuration of Example 21 enables simultaneous perception of the mirror image and the image without uncomfortable feeling. The configuration of Example 21 further enables easy adjustment of the position of the liquid crystal display device 3a according to the position of the viewer 8, and thereby achieves better usability.

EXAMPLE 22

Example 22 relates to a mirror display unit including a mirror display that includes a liquid crystal display device and a reflective polarizer as a half mirror layer, and tape as a guiding member. The difference from Example 2 is provision of a positioning mechanism that flexibly adjusts the distance between the display surface of the liquid crystal display device and the display surface of the half mirror plate, and a modification in the guiding member for easy measurement of the distance between the display surface of the half mirror plate and the viewer. Since the mirror display unit of Example 22 is the same as the mirror display unit of Example 2 except for the above configuration, the description of the same respects is omitted here.

Figure 23:
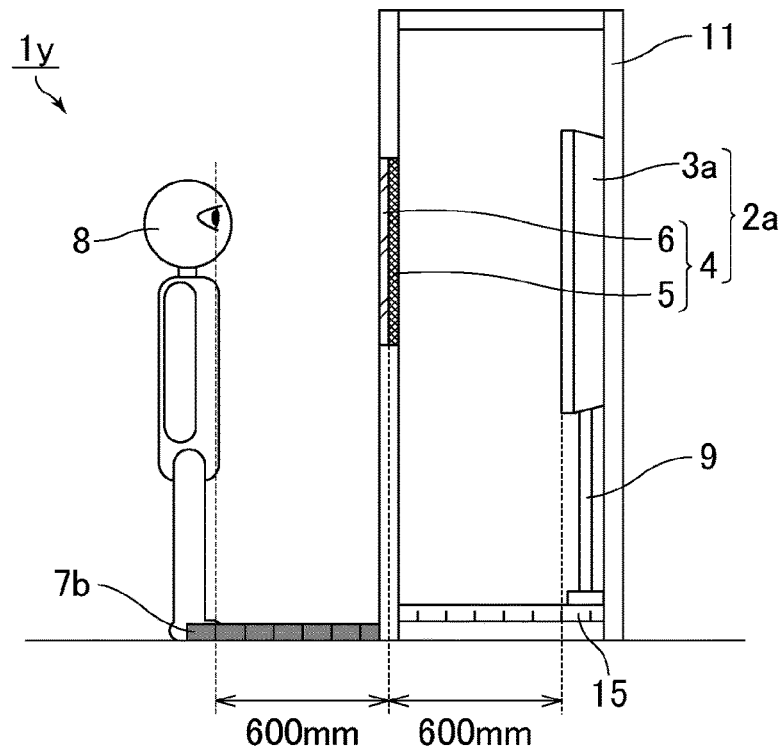
FIG. 23 is a schematic cross-sectional view of a mirror display unit of Example 22.

FIG. 23 is a schematic cross-sectional view of a mirror display unit of Example 22. As shown in FIG. 23, a mirror display unit 1y includes the mirror display 2a, the tape 7b as a guiding member disposed on the viewer side of the mirror display 2a, and the rail 15 as a positioning mechanism. The mirror display 2a includes, in the order from the back surface side to the viewer side, the liquid crystal display device 3a and the half mirror plate 4. The liquid crystal display device 3a was placed on the stand 9 with wheels and mounted on the rail 15. The tape 7b and the rail 15 used were the same as those used in Example 21. In the present example, the distance between the display surface of the half mirror plate 4 and the viewer 8 was 600 mm, and the distance between the display surface of the liquid crystal display device 3a and the display surface of the half mirror plate 4 was 600 mm.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1y has a configuration in which the distance between the display surface of the liquid crystal display device 3a and the display surface of the half mirror plate 4 is capable of being adjusted to be the same as the distance between the display surface of the half mirror plate 4 and the viewer 8, the focal point and convergence angle for viewing the mirror image can be made the same as those for viewing the image. Accordingly, the configuration of Example 22 enables simultaneous perception of the mirror image and the image without uncomfortable feeling. The configuration of Example 22 further enables easy adjustment of the position of the liquid crystal display device 3a according to the position of the viewer 8, and thereby achieves better usability.

EXAMPLE 23

Example 23 relates to a mirror display unit including a mirror display that includes a liquid crystal display device and a reflective polarizer as a half mirror layer, and a seat as a guiding member. The difference from Example 3 is provision of a positioning mechanism that flexibly adjusts the distance between the display surface of the liquid crystal display device and the display surface of the half mirror plate, and a modification in the guiding member for easy measurement of the distance between the display surface of the half mirror plate and the viewer. Since the mirror display unit of Example 23 is the same as the mirror display unit of Example 3 except for the above configuration, the description of the same respects is omitted here.

Figure 24:
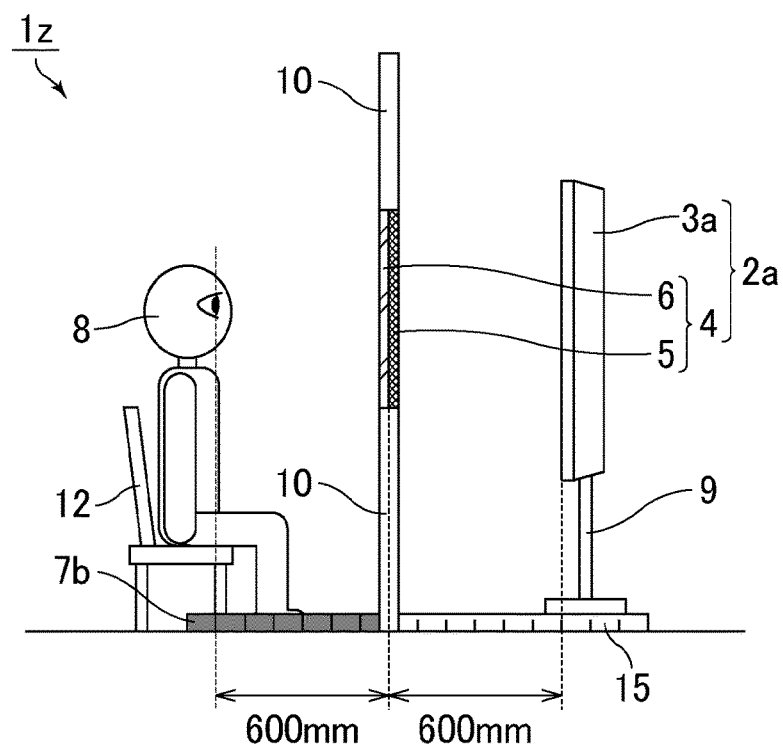
FIG. 24 is a schematic cross-sectional view of a mirror display unit of Example 23.

FIG. 24 is a schematic cross-sectional view of a mirror display unit of Example 23. As shown in FIG. 24, a mirror display unit 1z includes the mirror display 2a, the tape 7b and the seat 12 as guiding members disposed on the viewer side of the mirror display 2a, and the rail 15 as a positioning mechanism. The mirror display 2a includes, in the order from the back surface side to the viewer side, the liquid crystal display device 3a and the half mirror plate 4. The liquid crystal display device 3a was placed on the stand 9 with wheels and mounted on the rail 15. The tape 7b and the rail 15 used were the same as those used in Example 21. In the present example, the distance between the display surface of the half mirror plate 4 and the viewer 8 was 600 mm, and the distance between the display surface of the liquid crystal display device 3a and the display surface of the half mirror plate 4 was 600 mm.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1z has a configuration in which the distance between the display surface of the liquid crystal display device 3a and the display surface of the half mirror plate 4 is capable of being adjusted to be the same as the distance between the display surface of the half mirror plate 4 and the viewer 8, the focal point and convergence angle for viewing the mirror image can be made the same as those for viewing the image. Accordingly, the configuration of Example 23 enables simultaneous perception of the mirror image and the image without uncomfortable feeling. The configuration of Example 23 further enables easy adjustment of the position of the liquid crystal display device 3a according to the position of the viewer 8, and thereby achieves better usability.

EXAMPLE 24

Example 24 relates to a mirror display unit including a mirror display that includes a liquid crystal display device and a reflective polarizer as a half mirror layer, and a seat as a guiding member. The difference from Example 4 is provision of a positioning mechanism that flexibly adjusts the distance between the display surface of the liquid crystal display device and the display surface of the half mirror plate, and a modification in the guiding member for easy measurement of the distance between the display surface of the half mirror plate and the viewer. Since the mirror display unit of Example 24 is the same as the mirror display unit of Example 4 except for the above configuration, the description of the same respects is omitted here.

Figure 25:
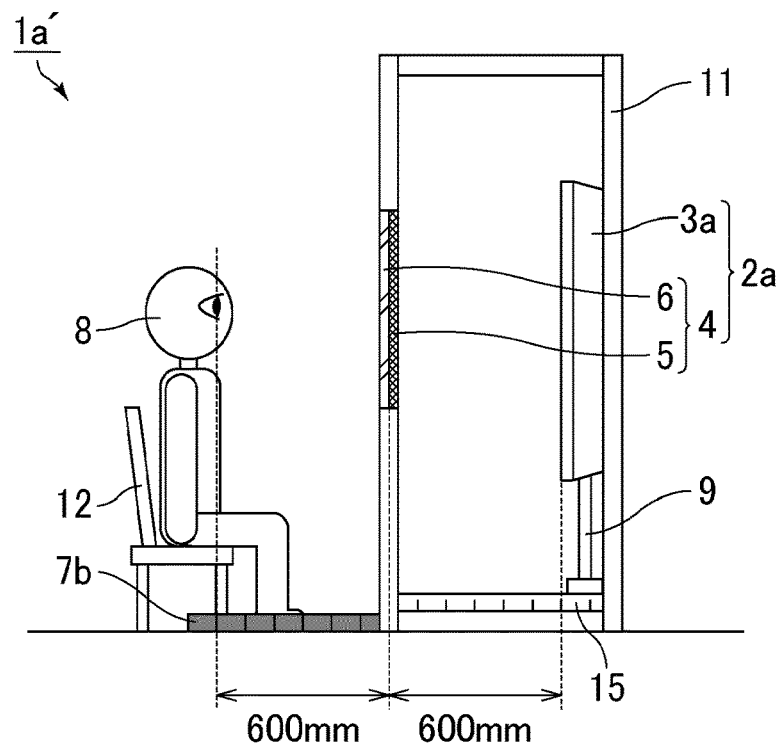
FIG. 25 is a schematic cross-sectional view of a mirror display unit of Example 24.

FIG. 25 is a schematic cross-sectional view of a mirror display unit of Example 24. As shown in FIG. 25, a mirror display unit 1a' includes the mirror display 2a, the tape 7b and the seat 12 as guiding members disposed on the viewer side of the mirror display 2a, and the rail 15 as a positioning mechanism. The mirror display 2a includes, in the order from the back surface side to the viewer side, the liquid crystal display device 3a and the half mirror plate 4. The liquid crystal display device 3a was placed on the stand 9 with wheels and mounted on the rail 15. The tape 7b and the rail 15 used were the same as those used in Example 21. In the present example, the distance between the display surface of the half mirror plate 4 and the viewer 8 was 600 mm, and the distance between the display surface of the liquid crystal display device 3a and the display surface of the half mirror plate 4 was 600 mm.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1a' has a configuration in which the distance between the display surface of the liquid crystal display device 3a and the display surface of the half mirror plate 4 is capable of being adjusted to be the same as the distance between the display surface of the half mirror plate 4 and the viewer 8, the focal point and convergence angle for viewing the mirror image can be made the same as those for viewing the image. Accordingly, the configuration of Example 24 enables simultaneous perception of the mirror image and the image without uncomfortable feeling. The configuration of Example 24 further enables easy adjustment of the position of the liquid crystal display device 3a according to the position of the viewer 8, and thereby achieves better usability.

EXAMPLE 25

Example 25 relates to a mirror display unit including a mirror display that includes a liquid crystal display device and a reflective polarizer as a half mirror layer, and a length measurement sensor. The difference from Example 1 is provision of a positioning mechanism that flexibly adjusts the distance between the display surface of the liquid crystal display device and the display surface of the half mirror plate, and provision of the length measurement sensor in place of the guiding member. Since the mirror display unit of Example 25 is the same as the mirror display unit of Example 1 except for the above configuration, the description of the same respects is omitted here.

Figure 26:
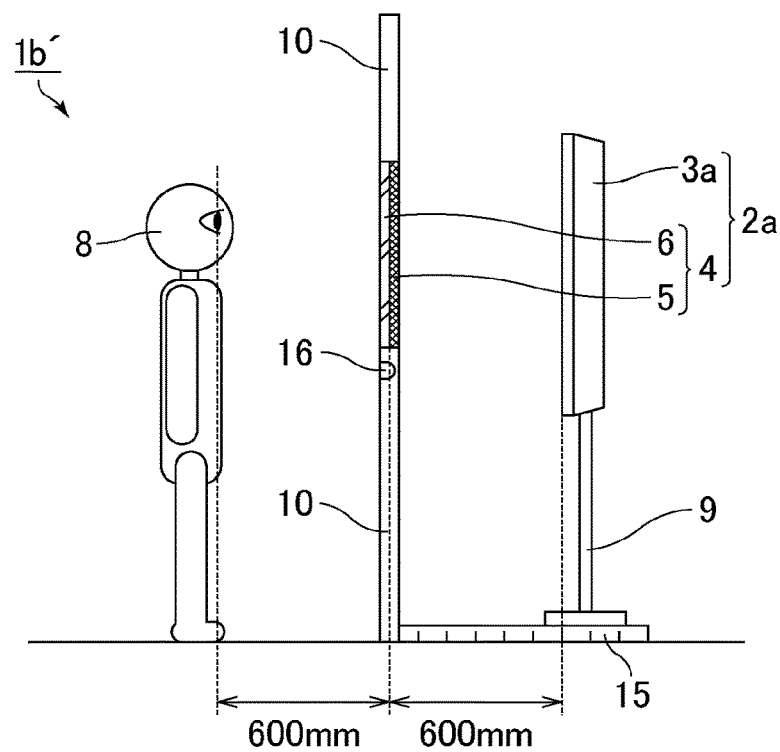
FIG. 26 is a schematic cross-sectional view of a mirror display unit of Example 25.

FIG. 26 is a schematic cross-sectional view of a mirror display unit of Example 25. As shown in FIG. 26, a mirror display unit 1b' includes the mirror display 2a, the rail 15 as a positioning mechanism, and a length measurement sensor 16. The mirror display 2a includes, in the order from the back surface side to the viewer side, the liquid crystal display device 3a and the half mirror plate 4. The liquid crystal display device 3a was placed on the stand 9 with wheels and mounted on the rail 15. The rail 15 used was the same as that used in Example 21. The length measurement sensor 16 was fixed by fitting in the wall 10.

The length measurement sensor 16 used was an infrared sensor. The infrared sensor can automatically measure the distance between the display surface of the half mirror plate 4 and the viewer 8. Furthermore, combination use of the liquid crystal display device 3a with the rail 15 that is electrically movable enables the display surface of the liquid crystal display device 3a to be automatically moved to an appropriate position (preferably, at a position apart from the display surface of the half mirror plate 4 by the same distance as the distance between the display surface of the half mirror plate 4 and the viewer 8), according to the distance between the display surface of the half mirror plate 4 and the viewer 8 automatically measured by the length measurement sensor 16. Although the length measurement sensor 16 was fixed by fitting in the wall 10, the method for placing and fixing the length measurement sensor 16 is not particularly limited as long as the sensor can measure the distance between the display surface of the half mirror plate 4 and the viewer 8. For example, since the half mirror plate 4 partly transmits light, the length measurement sensor 16 may be hiddenly fixed behind the back surface of the half mirror plate 4. In the present example, the distance between the display surface of the half mirror plate 4 and the viewer 8 was 600 mm, and the distance between the display surface of the liquid crystal display device 3a and the display surface of the half mirror plate 4 was 600 mm.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1b' has a configuration in which the distance between the display surface of the liquid crystal display device 3a and the display surface of the half mirror plate 4 is capable of being adjusted to be the same as the distance between the display surface of the half mirror plate 4 and the viewer 8, the focal point and convergence angle for viewing the mirror image can be made the same as those for viewing the image. Accordingly, the configuration of Example 25 enables simultaneous perception of the mirror image and the image without uncomfortable feeling. The configuration of Example 25 further enables easy adjustment of the position of the liquid crystal display device 3a according to the position of the viewer 8, and thereby achieves better usability.

EXAMPLE 26

Example 26 relates to a mirror display unit including a mirror display that includes a liquid crystal display device and a reflective polarizer as a half mirror layer, and a length measurement sensor. The difference from Example 2 is provision of a positioning mechanism that flexibly adjusts the distance between the display surface of the liquid crystal display device and the display surface of the half mirror plate, and provision of the length measurement sensor in place of the guiding member. Since the mirror display unit of Example 26 is the same as the mirror display unit of Example 2 except for the above configuration, the description of the same respects is omitted here.

Figure 27:
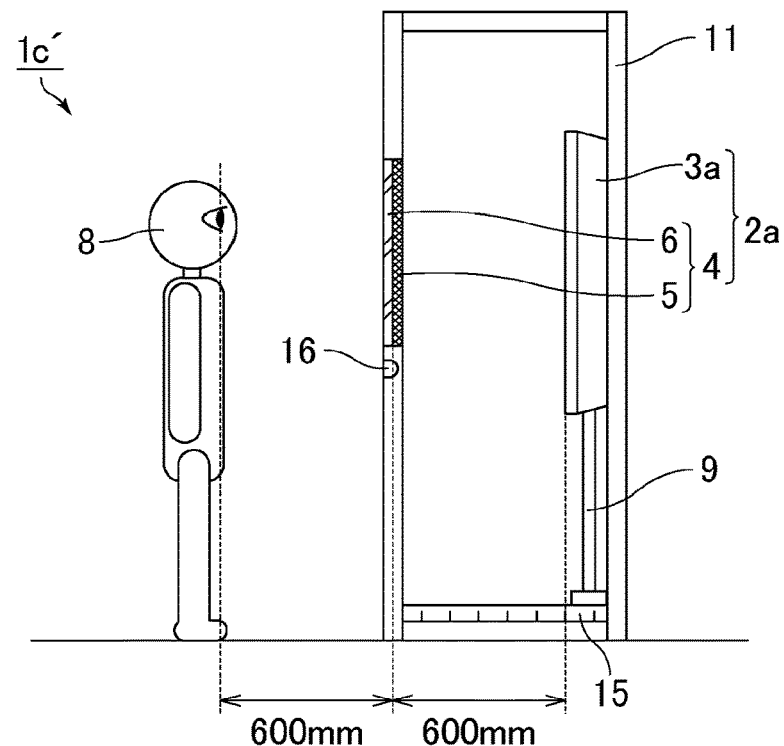
FIG. 27 is a schematic cross-sectional view of a mirror display unit of Example 26.

FIG. 27 is a schematic cross-sectional view of a mirror display unit of Example 26. As shown in FIG. 27, a mirror display unit 1c' includes the mirror display 2a, the rail 15 as a positioning mechanism, and the length measurement sensor 16. The mirror display 2a includes, in the order from the back surface side to the viewer side, the liquid crystal display device 3a and the half mirror plate 4. The liquid crystal display device 3a was placed on the stand 9 with wheels and mounted on the rail 15. The rail 15 used was the same as that used in Example 21. The length measurement sensor 16 was fixed by fitting in a hole in the surface of the box-shaped case 11. The length measurement sensor 16 used was the same as that used in Example 25. In the present example, the distance between the display surface of the half mirror plate 4 and the viewer 8 was 600 mm, and the distance between the display surface of the liquid crystal display device 3a and the display surface of the half mirror plate 4 was 600 mm.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1c' has a configuration in which the distance between the display surface of the liquid crystal display device 3a and the display surface of the half mirror plate 4 is capable of being adjusted to be the same as the distance between the display surface of the half mirror plate 4 and the viewer 8, the focal point and convergence angle for viewing the mirror image can be made the same as those for viewing the image. Accordingly, the configuration of Example 26 enables simultaneous perception of the mirror image and the image without uncomfortable feeling. The configuration of Example 26 further enables easy adjustment of the position of the liquid crystal display device 3a according to the position of the viewer 8, and thereby achieves better usability.

EXAMPLE 27

Example 27 relates to a mirror display unit including a mirror display that includes a liquid crystal display device and a reflective polarizer as a half mirror layer, and tape as a guiding member. The difference from Example 1 is the distance between the display surface of the half mirror plate and the tape (viewer). Since the mirror display unit of Example 27 is the same as the mirror display unit of Example 1 except for the above configuration, the description of the same respects is omitted here.

Figure 28:
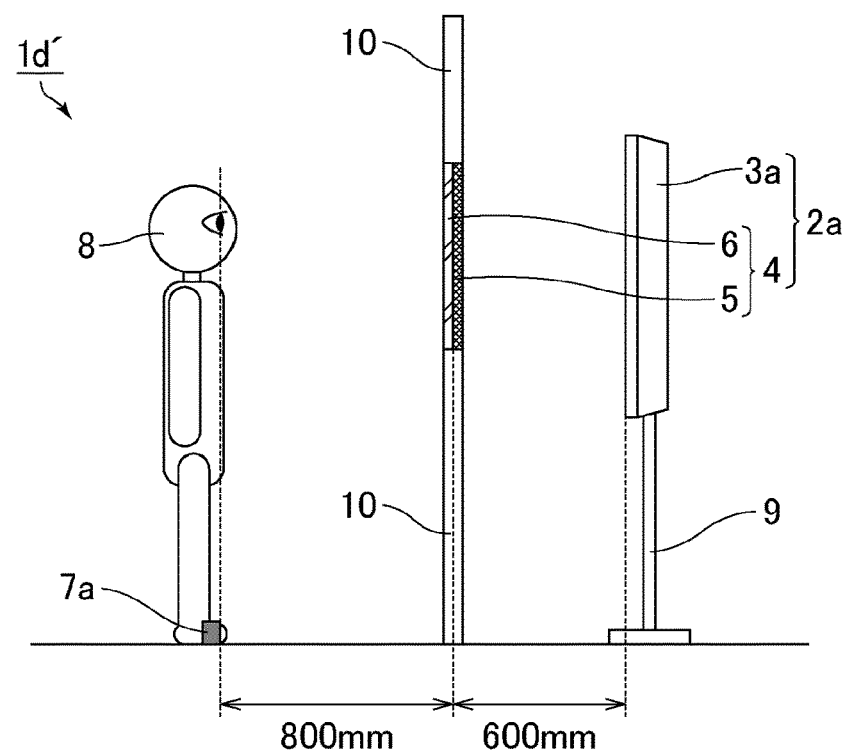
FIG. 28 is a schematic cross-sectional view of a mirror display unit of Example 27.

FIG. 28 is a schematic cross-sectional view of a mirror display unit of Example 27. As shown in FIG. 28, a mirror display unit 1d' includes the mirror display 2a and the tape 7a as a guiding member disposed on the viewer side of the mirror display 2a. The mirror display 2a includes, in the order from the back surface side to the viewer side, the liquid crystal display device 3a and the half mirror plate 4. The distance between the viewer 8-side display surface of the liquid crystal display device 3a and the viewer 8-side display surface of the half mirror plate 4 was 600 mm. The tape 7a was attached to the floor, in parallel with the display surface of the half mirror plate 4, at a position 800 mm apart from the viewer 8-side display surface of the half mirror plate 4 toward the viewer 8 side.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. The mirror display unit 1d' has a configuration in which the distance between the display surface of the liquid crystal display device 3a and the display surface of the half mirror plate 4 is not the same as the distance between the display surface of the half mirror plate 4 and the tape 7a (viewer 8), which is different from the configurations of Examples 1 and 5. However, since the configuration of Example 27 has a configuration in which the display surface of the liquid crystal display device 3a and the display surface of the half mirror plate 4 are placed more apart from each other than in conventional mirror displays, the mirror image and the image are simultaneously perceptible with sufficiently suppressed uncomfortable feeling, although the effect achieved by the configuration is smaller than that achieved by the configurations of Examples 1 and 5.

EXAMPLE 28

Example 28 relates to a mirror display unit including a mirror display that includes a liquid crystal display device and a reflective polarizer as a half mirror layer, and tape as a guiding member. The difference from Example 1 is the distance between the display surface of the liquid crystal display device and the display surface of the half mirror plate and the distance between the display surface of the half mirror plate and the tape (viewer). Since the mirror display unit of Example 28 is the same as the mirror display unit of Example 1 except for the above configuration, the description of the same respects is omitted here.

Figure 29:
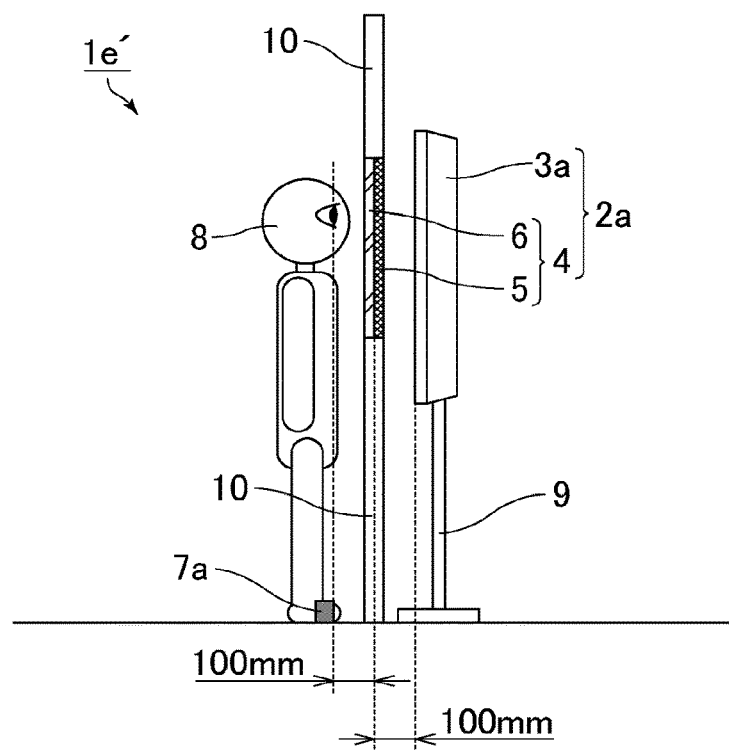
FIG. 29 is a schematic cross-sectional view of a mirror display unit of Example 28.

FIG. 29 is a schematic cross-sectional view of a mirror display unit of Example 28. As shown in FIG. 29, a mirror display unit 1e' includes the mirror display 2a and the tape 7a as a guiding member disposed on the viewer side of the mirror display 2a. The mirror display 2a includes, in the order from the back surface side to the viewer side, the liquid crystal display device 3a and the half mirror plate 4. The distance between the viewer 8-side display surface of the liquid crystal display device 3a and the viewer 8-side display surface of the half mirror plate 4 was 100 mm. The tape 7a was attached to the floor, in parallel with the display surface of the half mirror plate 4, at a position 100 mm apart from the viewer 8-side display surface of the half mirror plate 4 toward the viewer 8 side.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1e' has a configuration in which the distance between the display surface of the liquid crystal display device 3a and the display surface of the half mirror plate 4 is the same as the distance between the display surface of the half mirror plate 4 and the tape 7a (viewer 8), the focal point and convergence angle for viewing the mirror image can be made the same as those for viewing the image. Accordingly, the configuration of Example 28 enables simultaneous perception of the mirror image and the image without uncomfortable feeling.

EXAMPLE 29

Example 29 relates to a mirror display unit including a mirror display that includes a liquid crystal display device and a reflective polarizer as a half mirror layer, and tape as a guiding member. The difference from Example 28 is the distance between the display surface of the half mirror plate and the tape (viewer). Since the mirror display unit of Example 29 is the same as the mirror display unit of Example 28 except for the above configuration, the description of the same respects is omitted here.

Figure 30:
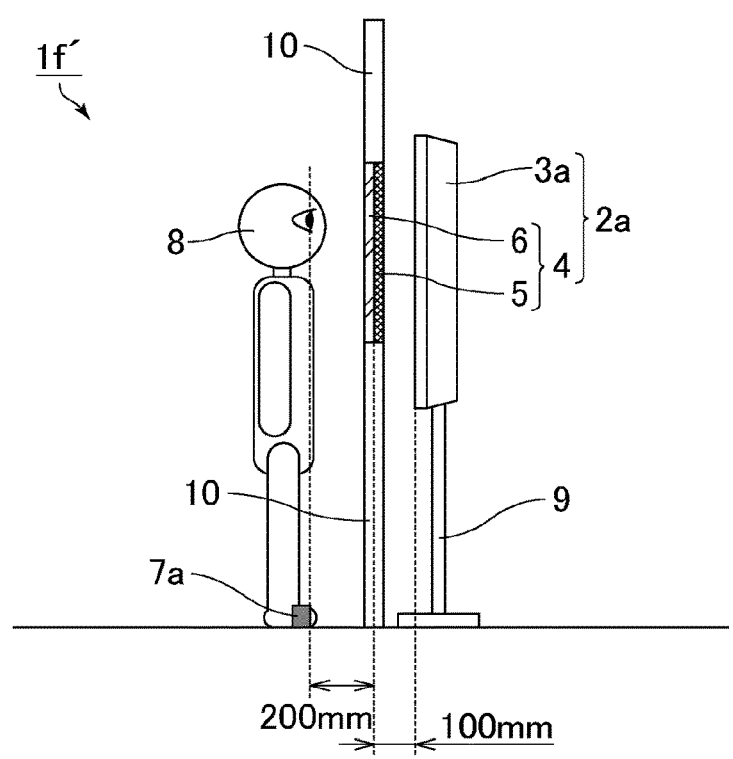
FIG. 30 is a schematic cross-sectional view of a mirror display unit of Example 29.

FIG. 30 is a schematic cross-sectional view of a mirror display unit of Example 29. As shown in FIG. 30, a mirror display unit 1f' includes the mirror display 2a and the tape 7a as a guiding member disposed on the viewer side of the mirror display 2a. The mirror display 2a includes, in the order from the back surface side to the viewer side, the liquid crystal display device 3a and the half mirror plate 4. The distance between the viewer 8-side display surface of the liquid crystal display device 3a and the viewer 8-side display surface of the half mirror plate 4 was 100 mm. The tape 7a was attached to the floor, in parallel with the display surface of the half mirror plate 4, at a position 200 mm apart from the viewer 8-side display surface of the half mirror plate 4 toward the viewer 8 side.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. The mirror display unit 1f has a configuration in which the distance between the display surface of the liquid crystal display device 3a and the display surface of the half mirror plate 4 is not the same as the distance between the display surface of the half mirror plate 4 and the tape 7a (viewer 8), which is different from the configuration of Example 28. However, since the configuration of Example 29 has a configuration in which the display surface of the liquid crystal display device 3a and the display surface of the half mirror plate 4 are placed more apart from each other than in conventional mirror displays, the mirror image and the image are simultaneously perceptible with sufficiently suppressed uncomfortable feeling, although the effect achieved by the configuration is smaller than that achieved by the configuration of Example 28.

EXAMPLE 30

Example 30 relates to a mirror display unit including a mirror display that includes a liquid crystal display device and a reflective polarizer as a half mirror layer, and tape as a guiding member. The difference from Example 1 is the distance between the display surface of the liquid crystal display device and the display surface of the half mirror plate and the distance between the display surface of the half mirror plate and the tape (viewer). Since the mirror display unit of Example 30 is the same as the mirror display unit of Example 1 except for the above configuration, the description of the same respects is omitted here.

Figure 31:
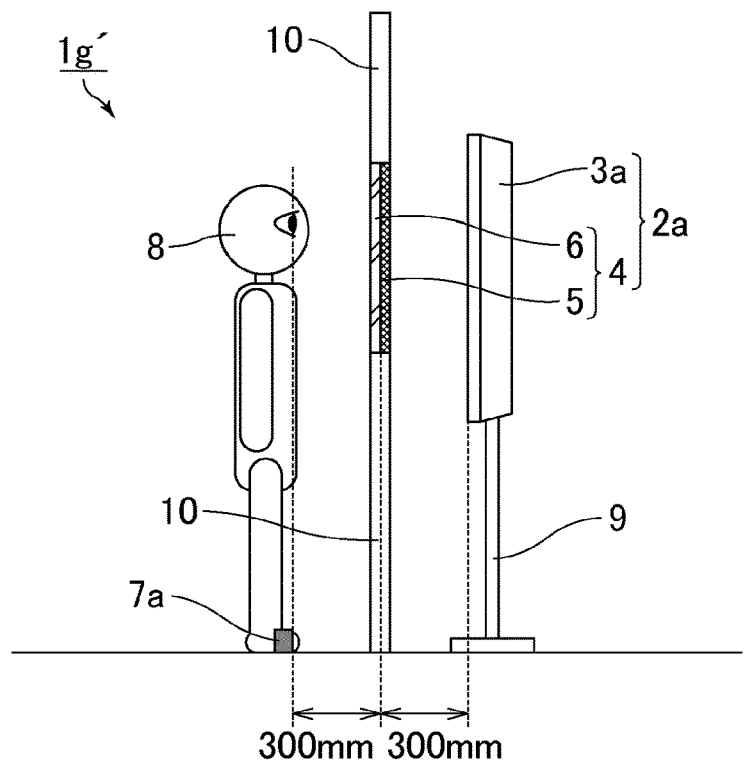
FIG. 31 is a schematic cross-sectional view of a mirror display unit of Example 30.

FIG. 31 is a schematic cross-sectional view of a mirror display unit of Example 30. As shown in FIG. 31, a mirror display unit 1g' includes the mirror display 2a and the tape 7a as a guiding member disposed on the viewer side of the mirror display 2a. The mirror display 2a includes, in the order from the back surface side to the viewer side, the liquid crystal display device 3a and the half mirror plate 4. The distance between the viewer 8-side display surface of the liquid crystal display device 3a and the viewer 8-side display surface of the half mirror plate 4 was 300 mm. The tape 7a was attached to the floor, in parallel with the display surface of the half mirror plate 4, at a position 300 mm apart from the viewer 8-side display surface of the half mirror plate 4 toward the viewer 8 side.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1g' has a configuration in which the distance between the display surface of the liquid crystal display device 3a and the display surface of the half mirror plate 4 is the same as the distance between the display surface of the half mirror plate 4 and the tape 7a (viewer 8), the focal point and convergence angle for viewing the mirror image can be made the same as those for viewing the image. Accordingly, the configuration of Example 30 enables simultaneous perception of the mirror image and the image without uncomfortable feeling.

EXAMPLE 31

Example 31 relates to a mirror display unit including a mirror display that includes a liquid crystal display device and a reflective polarizer as a half mirror layer, and tape as a guiding member. The difference from Example 30 is the distance between the display surface of the half mirror plate and the tape (viewer). Since the mirror display unit of Example 31 is the same as the mirror display unit of Example 30 except for the above configuration, the description of the same respects is omitted here.

Figure 32:
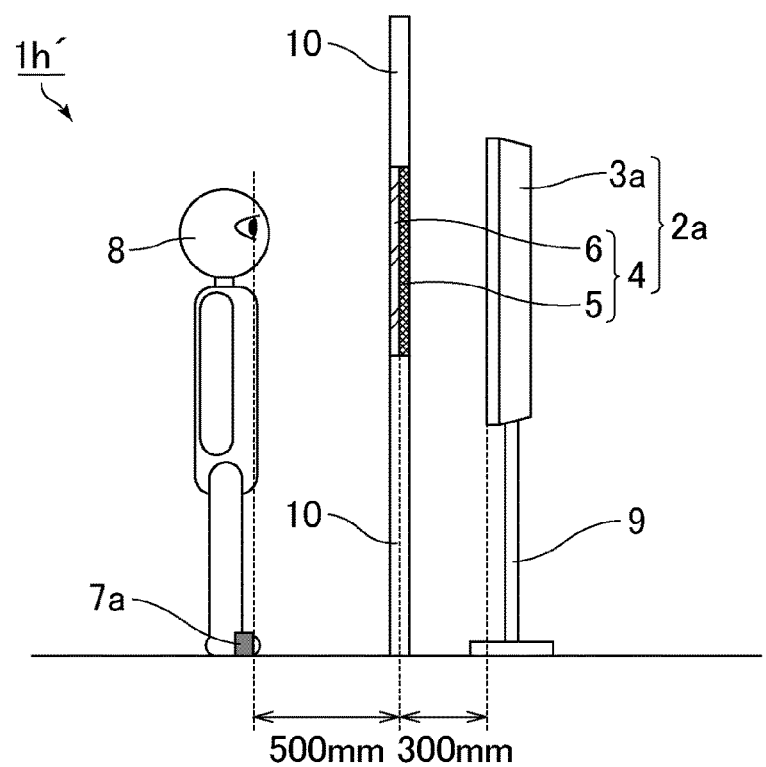
FIG. 32 is a schematic cross-sectional view of a mirror display unit of Example 31.

FIG. 32 is a schematic cross-sectional view of a mirror display unit of Example 31. As shown in FIG. 32, a mirror display unit 1h' includes the mirror display 2a and the tape 7a as a guiding member disposed on the viewer side of the mirror display 2a. The mirror display 2a includes, in the order from the back surface side to the viewer side, the liquid crystal display device 3a and the half mirror plate 4. The distance between the viewer 8-side display surface of the liquid crystal display device 3a and the viewer 8-side display surface of the half mirror plate 4 was 300 mm. The tape 7a was attached to the floor, in parallel with the display surface of the half mirror plate 4, at a position 500 mm apart from the viewer 8-side display surface of the half mirror plate 4 toward the viewer 8 side.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. The mirror display unit 1h' has a configuration in which the distance between the display surface of the liquid crystal display device 3a and the display surface of the half mirror plate 4 is not the same as the distance between the display surface of the half mirror plate 4 and the tape 7a (viewer 8), which is different from the configuration of Example 30. However, since the configuration of Example 31 has a configuration in which the display surface of the liquid crystal display device 3a and the display surface of the half mirror plate 4 are placed more apart from each other than in conventional mirror displays, the mirror image and the image are simultaneously perceptible with sufficiently suppressed uncomfortable feeling, although the effect achieved by the configuration is smaller than that achieved by the configuration of Example 30.

EXAMPLE 32

Example 32 relates to a mirror display unit including a mirror display that includes a liquid crystal display device and a reflective polarizer as a half mirror layer, and tape as a guiding member. The difference from Example 1 is the distance between the display surface of the liquid crystal display device and the display surface of the half mirror plate and the distance between the display surface of the half mirror plate and the tape (viewer). Since the mirror display unit of Example 32 is the same as the mirror display unit of Example 1 except for the above configuration, the description of the same respects is omitted here.

Figure 33:
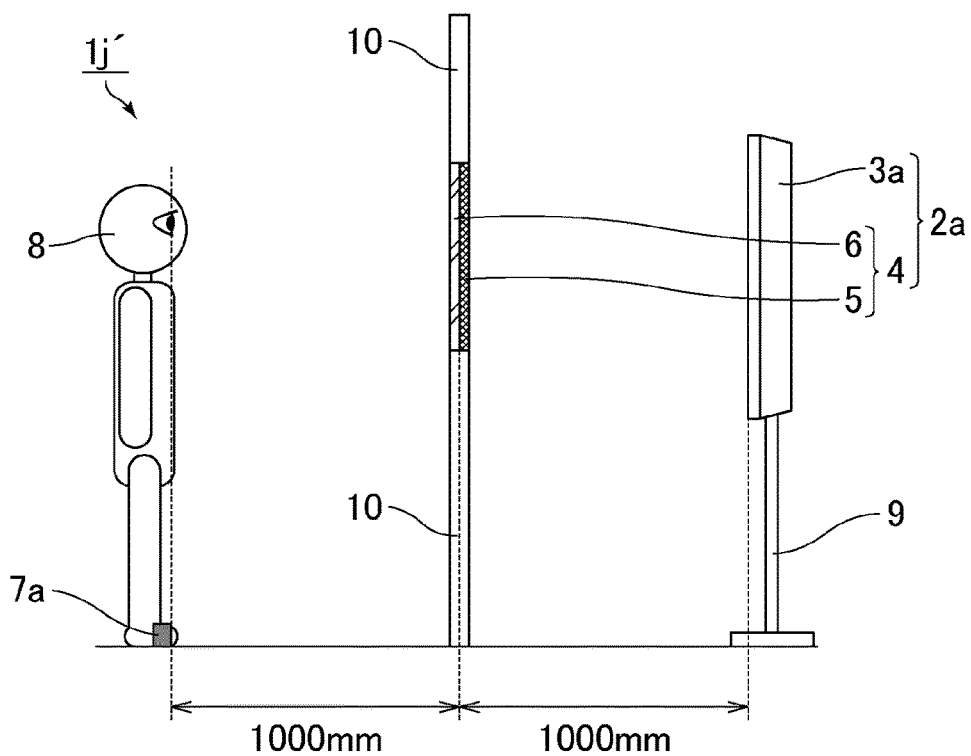
FIG. 33 is a schematic cross-sectional view of a mirror display unit of Example 32.

FIG. 33 is a schematic cross-sectional view of a mirror display unit of Example 32. As shown in FIG. 33, a mirror display unit 1j' includes the mirror display 2a and the tape 7a as a guiding member disposed on the viewer side of the mirror display 2a. The mirror display 2a includes, in the order from the back surface side to the viewer side, the liquid crystal display device 3a and the half mirror plate 4. The distance between the viewer 8-side display surface of the liquid crystal display device 3a and the viewer 8-side display surface of the half mirror plate 4 was 1000 mm. The tape 7a was attached to the floor, in parallel with the display surface of the half mirror plate 4, at a position 1000 mm apart from the viewer 8-side display surface of the half mirror plate 4 toward the viewer 8 side.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. Moreover, since the mirror display unit 1j' has a configuration in which the distance between the display surface of the liquid crystal display device 3a and the display surface of the half mirror plate 4 is the same as the distance between the display surface of the half mirror plate 4 and the tape 7a (viewer 8), the focal point and convergence angle for viewing the mirror image can be made the same as those for viewing the image. Accordingly, the configuration of Example 32 enables simultaneous perception of the mirror image and the image without uncomfortable feeling.

EXAMPLE 33

Example 33 relates to a mirror display unit including a mirror display that includes a liquid crystal display device and a reflective polarizer as a half mirror layer, and tape as a guiding member. The difference from Example 32 is the distance between the display surface of the half mirror plate and the tape (viewer). Since the mirror display unit of Example 33 is the same as the mirror display unit of Example 32 except for the above configuration, the description of the same respects is omitted here.

Figure 34:
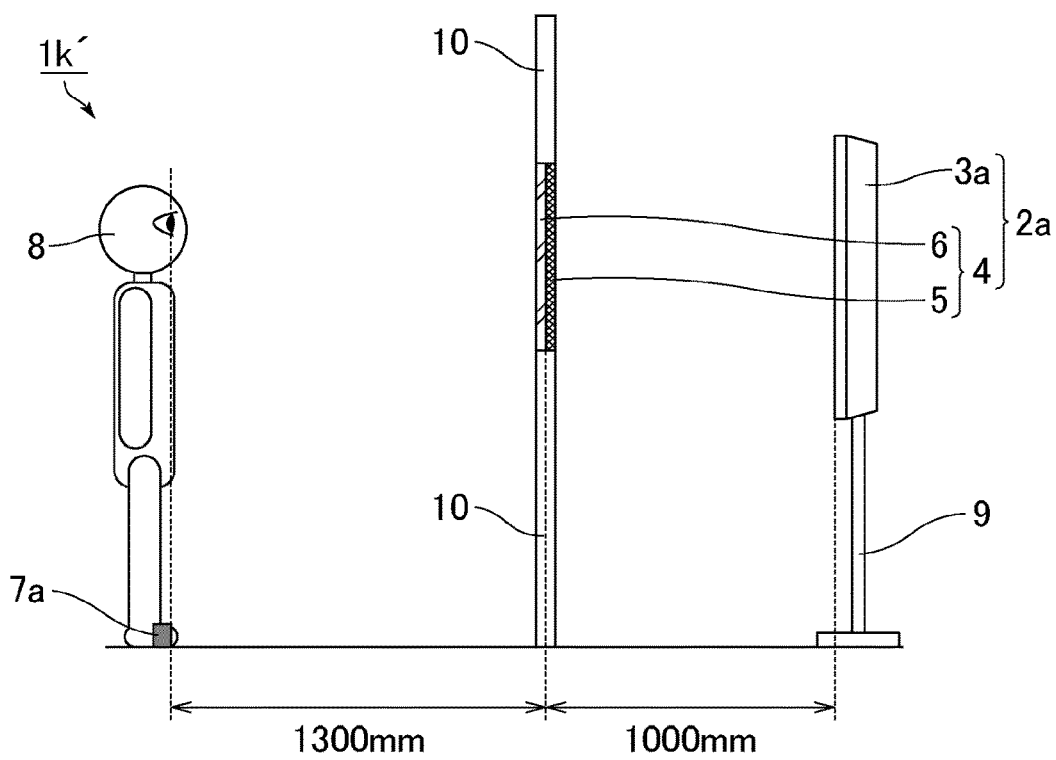
FIG. 34 is a schematic cross-sectional view of a mirror display unit of Example 33.

FIG. 34 is a schematic cross-sectional view of a mirror display unit of Example 33. As shown in FIG. 34, a mirror display unit 1k' includes the mirror display 2a and the tape 7a as a guiding member disposed on the viewer side of the mirror display 2a. The mirror display 2a includes, in the order from the back surface side to the viewer side, the liquid crystal display device 3a and the half mirror plate 4. The distance between the viewer 8-side display surface of the liquid crystal display device 3a and the viewer 8-side display surface of the half mirror plate 4 was 1000 mm. The tape 7a was attached to the floor, in parallel with the display surface of the half mirror plate 4, at a position 1300 mm apart from the viewer 8-side display surface of the half mirror plate 4 toward the viewer 8 side.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. The mirror display unit 1k' has a configuration in which the distance between the display surface of the liquid crystal display device 3a and the display surface of the half mirror plate 4 is not the same as the distance between the display surface of the half mirror plate 4 and the tape 7a (viewer 8), which is different from the configuration of Example 32. However, since the configuration of Example 33 has a configuration in which the display surface of the liquid crystal display device 3a and the display surface of the half mirror plate 4 are placed more apart from each other than in conventional mirror displays, the mirror image and the image are simultaneously perceptible with sufficiently suppressed uncomfortable feeling, although the effect achieved by the configuration is smaller than that achieved by the configuration of Example 32.

EXAMPLE 34

Example 34 relates to a mirror display unit including a mirror display that includes a liquid crystal display device and a reflective polarizer as a half mirror layer, and tape as a guiding member. The difference from Example 32 is the distance between the display surface of the half mirror plate and the tape (viewer). Since the mirror display unit of Example 34 is the same as the mirror display unit of Example 32 except for the above configuration, the description of the same respects is omitted here.

Figure 35:
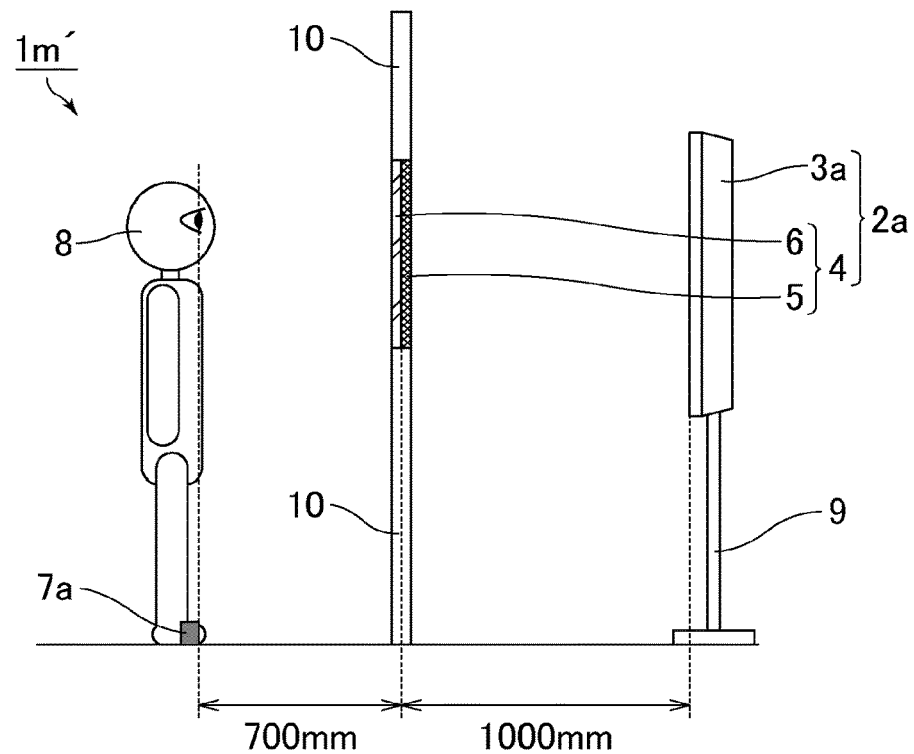
FIG. 35 is a schematic cross-sectional view of a mirror display unit of Example 34.

FIG. 35 is a schematic cross-sectional view of a mirror display unit of Example 34. As shown in FIG. 35, a mirror display unit 1m' includes the mirror display 2a and the tape 7a as a guiding member disposed on the viewer side of the mirror display 2a. The mirror display 2a includes, in the order from the back surface side to the viewer side, the liquid crystal display device 3a and the half mirror plate 4. The distance between the viewer 8-side display surface of the liquid crystal display device 3a and the viewer 8-side display surface of the half mirror plate 4 was 1000 mm. The tape 7a was attached to the floor, in parallel with the display surface of the half mirror plate 4, at a position 700 mm apart from the viewer 8-side display surface of the half mirror plate 4 toward the viewer 8 side.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. The mirror display unit 1m' has a configuration in which the distance between the display surface of the liquid crystal display device 3a and the display surface of the half mirror plate 4 is not the same as the distance between the display surface of the half mirror plate 4 and the tape 7a (viewer 8), which is different from the configuration of Example 32. However, since the configuration of Example 34 has a configuration in which the display surface of the liquid crystal display device 3a and the display surface of the half mirror plate 4 are placed more apart from each other than in conventional mirror displays, the mirror image and the image are simultaneously perceptible with sufficiently suppressed uncomfortable feeling, although the effect achieved by the configuration is smaller than that achieved by the configuration of Example 32.

EXAMPLE 35

Example 35 relates to a mirror display unit including a mirror display that includes a liquid crystal display device and a reflective polarizer as a half mirror layer, and tape as a guiding member. The difference from Example 29 is the distance between the display surface of the half mirror plate and the tape (viewer). Since the mirror display unit of Example 35 is the same as the mirror display unit of Example 29 except for the above configuration, the description of the same respects is omitted here.

Figure 36:
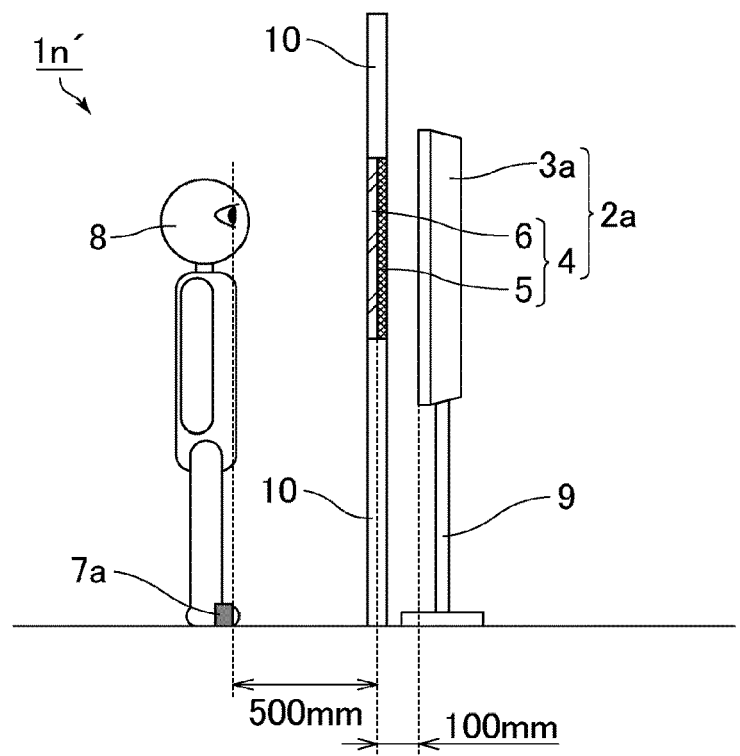
FIG. 36 is a schematic cross-sectional view of a mirror display unit of Example 35.

FIG. 36 is a schematic cross-sectional view of a mirror display unit of Example 35. As shown in FIG. 36, a mirror display unit 1n' includes the mirror display 2a and the tape 7a as a guiding member disposed on the viewer side of the mirror display 2a. The mirror display 2a includes, in the order from the back surface side to the viewer side, the liquid crystal display device 3a and the half mirror plate 4. The distance between the viewer 8-side display surface of the liquid crystal display device 3a and the viewer 8-side display surface of the half mirror plate 4 was 100 mm. The tape 7a was attached to the floor, in parallel with the display surface of the half mirror plate 4, at a position 500 mm apart from the viewer 8-side display surface of the half mirror plate 4 toward the viewer 8 side.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. The configuration of the mirror display unit 1n' has a larger difference between the distance between the display surface of the liquid crystal display device 3a and the display surface of the half mirror plate 4 and the distance between the display surface of the half mirror plate 4 and the tape 7a (viewer 8) than the configuration of Example 29. However, since the configuration of Example 35 has a configuration in which the display surface of the liquid crystal display device 3a and the display surface of the half mirror plate 4 are placed more apart from each other than in conventional mirror displays, the mirror image and the image are simultaneously perceptible with suppressed uncomfortable feeling, although the effect achieved by the configuration is smaller than that achieved by the configuration of Example 29.

EXAMPLE 36

Example 36 relates to a mirror display unit including a mirror display that includes a liquid crystal display device and a reflective polarizer as a half mirror layer, and tape as a guiding member. The difference from Example 31 is the distance between the display surface of the half mirror plate and the tape (viewer). Since the mirror display unit of Example 36 is the same as the mirror display unit of Example 31 except for the above configuration, the description of the same respects is omitted here.

Figure 37:
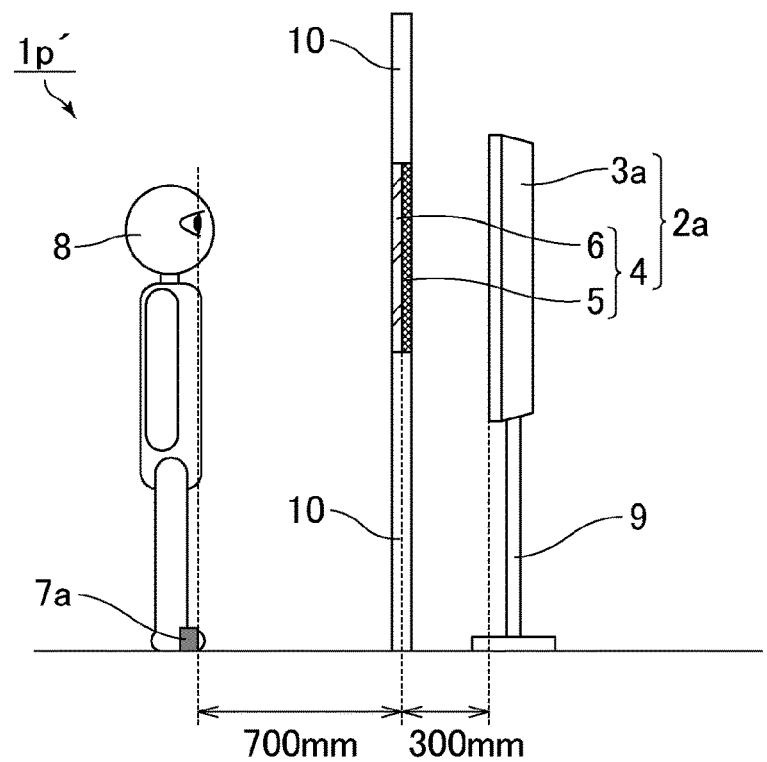
FIG. 37 is a schematic cross-sectional view of a mirror display unit of Example 36.

FIG. 37 is a schematic cross-sectional view of a mirror display unit of Example 36. As shown in FIG. 37, a mirror display unit 1p' includes the mirror display 2a and the tape 7a as a guiding member disposed on the viewer side of the mirror display 2a. The mirror display 2a includes, in the order from the back surface side to the viewer side, the liquid crystal display device 3a and the half mirror plate 4. The distance between the viewer 8-side display surface of the liquid crystal display device 3a and the viewer 8-side display surface of the half mirror plate 4 was 300 mm. The tape 7a was attached to the floor, in parallel with the display surface of the half mirror plate 4, at a position 700 mm apart from the viewer 8-side display surface of the half mirror plate 4 toward the viewer 8 side.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. The configuration of the mirror display unit 1p' has a larger difference between the distance between the display surface of the liquid crystal display device 3a and the display surface of the half mirror plate 4 and the distance between the display surface of the half mirror plate 4 and the tape 7a (viewer 8) than the configuration of Example 31. However, since the configuration of Example 36 has a configuration in which the display surface of the liquid crystal display device 3a and the display surface of the half mirror plate 4 are placed more apart from each other than in conventional mirror displays, the mirror image and the image are simultaneously perceptible with suppressed uncomfortable feeling, although the effect achieved by the configuration is smaller than that achieved by the configuration of Example 31.

EXAMPLE 37

Example 37 relates to a mirror display unit including a mirror display that includes a liquid crystal display device and a reflective polarizer as a half mirror layer, and tape as a guiding member. The difference from Example 27 is the distance between the display surface of the half mirror plate and the tape (viewer). Since the mirror display unit of Example 37 is the same as the mirror display unit of Example 27 except for the above configuration, the description of the same respects is omitted here.

Figure 38:
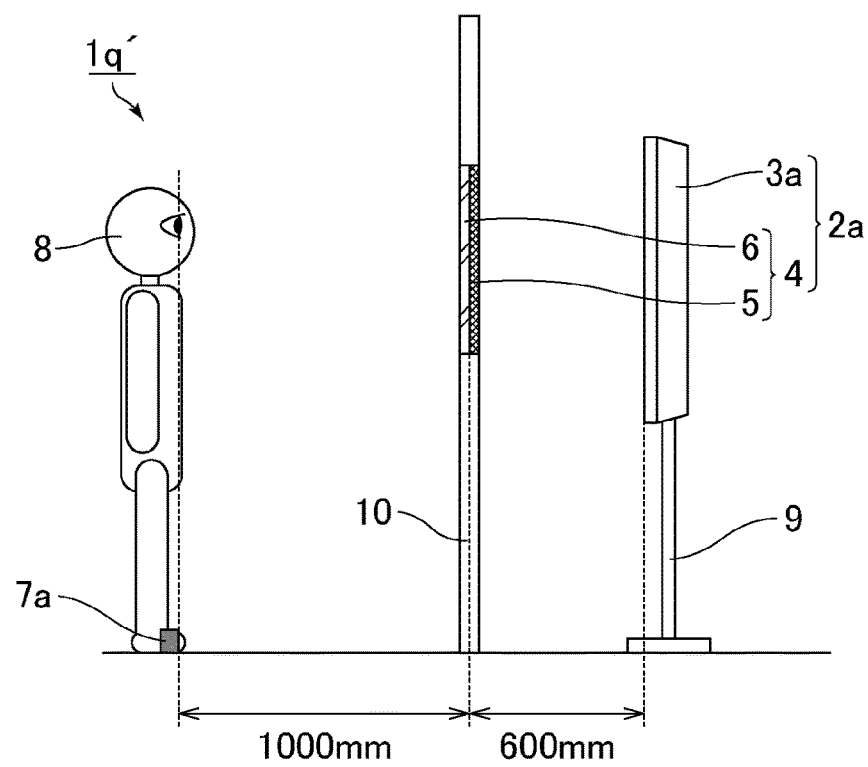
FIG. 38 is a schematic cross-sectional view of a mirror display unit of Example 37.

FIG. 38 is a schematic cross-sectional view of a mirror display unit of Example 37. As shown in FIG. 38, a mirror display unit 1q' includes the mirror display 2a and the tape 7a as a guiding member disposed on the viewer side of the mirror display 2a. The mirror display 2a includes, in the order from the back surface side to the viewer side, the liquid crystal display device 3a and the half mirror plate 4. The distance between the viewer 8-side display surface of the liquid crystal display device 3a and the viewer 8-side display surface of the half mirror plate 4 was 600 mm. The tape 7a was attached to the floor, in parallel with the display surface of the half mirror plate 4, at a position 1000 mm apart from the viewer 8-side display surface of the half mirror plate 4 toward the viewer 8 side.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. The configuration of the mirror display unit 1q' has a larger difference between the distance between the display surface of the liquid crystal display device 3a and the display surface of the half mirror plate 4 and the distance between the display surface of the half mirror plate 4 and the tape 7a (viewer 8) than the configuration of Example 27. However, since the configuration of Example 37 has a configuration in which the display surface of the liquid crystal display device 3a and the display surface of the half mirror plate 4 are placed more apart from each other than in conventional mirror displays, the mirror image and the image are simultaneously perceptible with suppressed uncomfortable feeling, although the effect achieved by the configuration is smaller than that achieved by the configuration of Example 27.

EXAMPLE 38

Example 38 relates to a mirror display unit including a mirror display that includes a liquid crystal display device and a reflective polarizer as a half mirror layer, and tape as a guiding member. The difference from Examples 33 and 34 is the distance between the display surface of the half mirror plate and the tape (viewer). Since the mirror display unit of Example 38 is the same as the mirror display units of Examples 33 and 34 except for the above configuration, the description of the same respects is omitted here.

Figure 39:
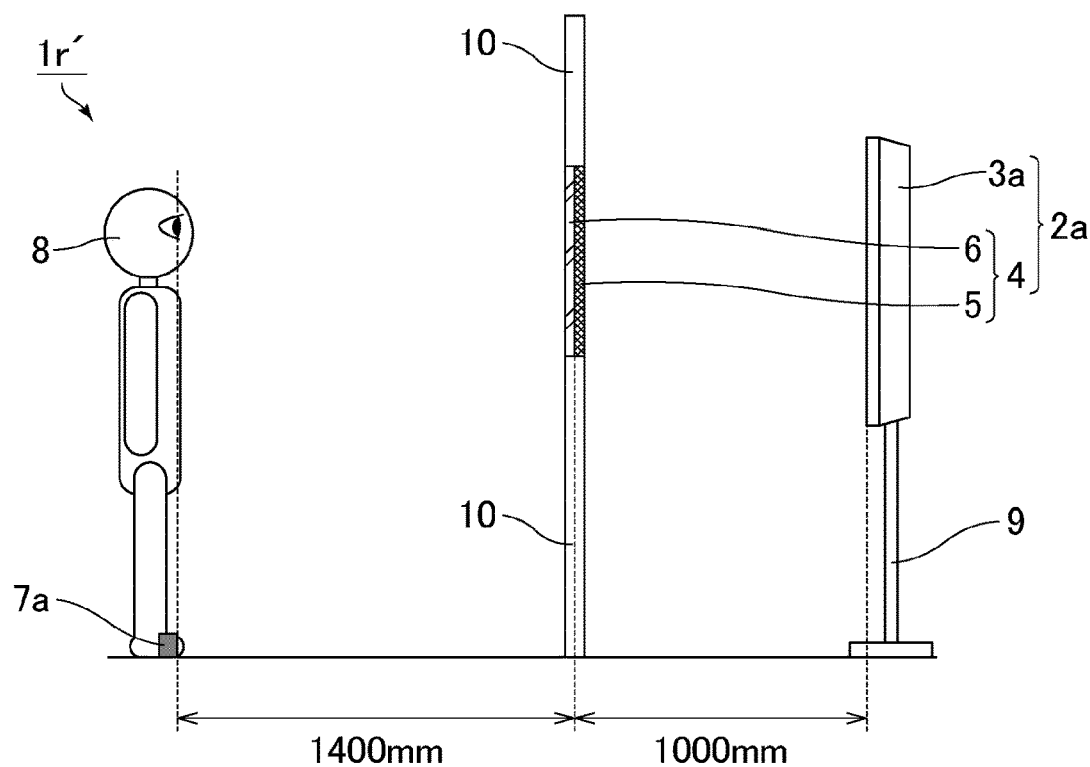
FIG. 39 is a schematic cross-sectional view of a mirror display unit of Example 38.

FIG. 39 is a schematic cross-sectional view of a mirror display unit of Example 38. As shown in FIG. 39, a mirror display unit 1r' includes the mirror display 2a and the tape 7a as a guiding member disposed on the viewer side of the mirror display 2a. The mirror display 2a includes, in the order from the back surface side to the viewer side, the liquid crystal display device 3a and the half mirror plate 4. The distance between the viewer 8-side display surface of the liquid crystal display device 3a and the viewer 8-side display surface of the half mirror plate 4 was 1000 mm. The tape 7a was attached to the floor, in parallel with the display surface of the half mirror plate 4, at a position 1400 mm apart from the viewer 8-side display surface of the half mirror plate 4 toward the viewer 8 side.

Since the mirror display 2a has a configuration in which the display surface of the liquid crystal display device 3a and the display surface of the half mirror plate 4 are placed more apart from each other than in conventional mirror displays, the mirror image and the image can be brought close to the positions with the same depth. The configuration of the mirror display unit 1r' has a larger difference between the distance between the display surface of the liquid crystal display device 3a and the display surface of the half mirror plate 4 and the distance between the display surface of the half mirror plate 4 and the tape 7a (viewer 8) than the configurations of Examples 33 and 34. However, since the configuration of Example 38 has a configuration in which the display surface of the liquid crystal display device 3a and the display surface of the half mirror plate 4 are placed more apart from each other than in conventional mirror displays, the mirror image and the image are simultaneously perceptible with suppressed uncomfortable feeling, although the effect achieved by the configuration is smaller than that achieved by the configurations of Example 33 and 34.

COMPARATIVE EXAMPLE 1

Comparative Example 1 relates to a mirror display unit including a mirror display that includes a liquid crystal display device and a reflective polarizer as a half mirror layer, and tape as a guiding member. Comparative Example 1 is the case where the display surface of the liquid crystal display device is placed substantially in close contact with the display surface of the half mirror plate.

Figure 40:
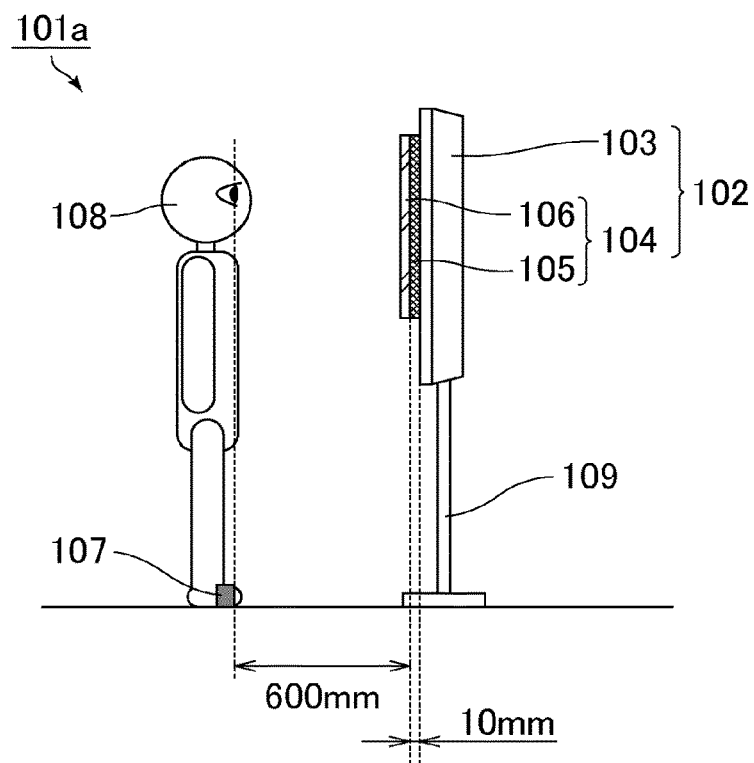
FIG. 40 is a schematic cross-sectional view of a mirror display unit of Comparative Example 1.

FIG. 40 is a schematic cross-sectional view of a mirror display unit of Comparative Example 1. As shown in FIG. 40, a mirror display unit 101a includes the mirror display 102 and tape 107 as a guiding member disposed on the viewer side of the mirror display 102. The mirror display 102 includes, in the order from the back surface side to the viewer side, the liquid crystal display device 103 and the half mirror plate 104. The liquid crystal display device 103 was placed on a stand 109. The liquid crystal display device 103 and the half mirror plate 104 were fixed by fitting the upper and lower edges of the half mirror plate 104 to a pair of aluminum rails which were attached to the upper and lower edges of the liquid crystal display device 103 so as to form a frame-like structure. The liquid crystal display device 103 and the half mirror plate 104 may be fixed by any method, such as by fixing the periphery of the half mirror plate 104 to the liquid crystal display device 103 with an adhesive tape. The distance between the viewer 108-side display surface of the liquid crystal display device 103 and the viewer 108-side display surface of the half mirror plate 104 was 10 mm. The display surface of the liquid crystal display device 103 was substantially in close contact with the display surface of the half mirror plate 104. The tape 107 was attached to the floor, in parallel with the display surface of the half mirror plate 104, at a position 600 mm apart from the viewer 108-side display surface of the half mirror plate 104 toward the viewer 108 side.

The liquid crystal display device 103 used was a liquid crystal television (trade name: LC-20F5, Sharp Corporation) including a backlight, two absorptive polarizers disposed in a crossed-Nicols state, a liquid crystal display panel, and a bezel (not shown). The transmission axis of the back-surface-side absorptive polarizer was at an azimuth angle of 0° and the transmission axis of the viewer-side absorptive polarizer was at an azimuth angle of 90°, provided that the degree of azimuth angle is defined to be positive (+) in the counterclockwise direction starting from the long side of the liquid crystal display device 103. The azimuth angles of the axes are described on the basis of the above definition hereinbelow. The viewer-side absorptive polarizer underwent no anti-reflection treatment but underwent an anti-glare (AG) treatment with a haze of 3.0% on the surface thereof. The display mode of the liquid crystal display panel was UV$^2$A. In the present comparative example, the display surface of the liquid crystal display device 103 corresponds to the viewer-side surface of the viewer-side absorptive polarizer.

The half mirror plate 104 includes, in the order from the back surface side to the viewer side, a reflective polarizer 105 as a half mirror layer and a glass substrate 106 as a base material. The respective members were bonded to each other with an acrylic adhesive (not shown) in between. The half mirror plate 104 had about the same size as the display region of the liquid crystal display device 103. In the present comparative example, the display surface of the half mirror plate 104 corresponds to the viewer-side surface of the reflective polarizer 105.

The reflective polarizer 105 used was a multilayer reflective polarizer (trade name: DBEF) available from Sumitomo 3M Ltd. The reflective polarizer 105 was placed such that the transmission axis had an azimuth angle of 90°. The glass substrate 106 had a thickness of 2.5 mm.

The tape 107 functions as a mark (guiding member) indicating the position (viewing position) of the viewer 108.

The mirror display 102, in which the display surface of the liquid crystal display device 103 and the display surface of the half mirror plate 104 are placed substantially in close contact with each other as in conventional mirror displays, fails to bring the mirror image and the image close to the positions with the same depth. Moreover, since the mirror display unit 101a has a configuration in which the distance between the display surface of the liquid crystal display device 103 and the display surface of the half mirror plate 104 significantly differs from the distance between the display surface of the half mirror plate 104 and the tape 107 (viewer 108), large differences are unfortunately caused between the focal point and convergence angle for viewing the mirror image and those for viewing the image. Accordingly, the configuration of Comparative Example 1 fails to suppress uncomfortable feeling and thus results in failure in simultaneous perception of the mirror image and the image.

COMPARATIVE EXAMPLE 2

Comparative Example 2 relates to a mirror display unit including a mirror display that includes a liquid crystal display device and a reflective polarizer as a half mirror layer, and a seat as a guiding member. The difference from Comparative Example 1 is use of the seat as a guiding member in addition to the tape. Since the mirror display unit of Comparative Example 2 is the same as the mirror display unit of Comparative Example 1 except for the above configuration, the description of the same respects is omitted here.

Figure 41:
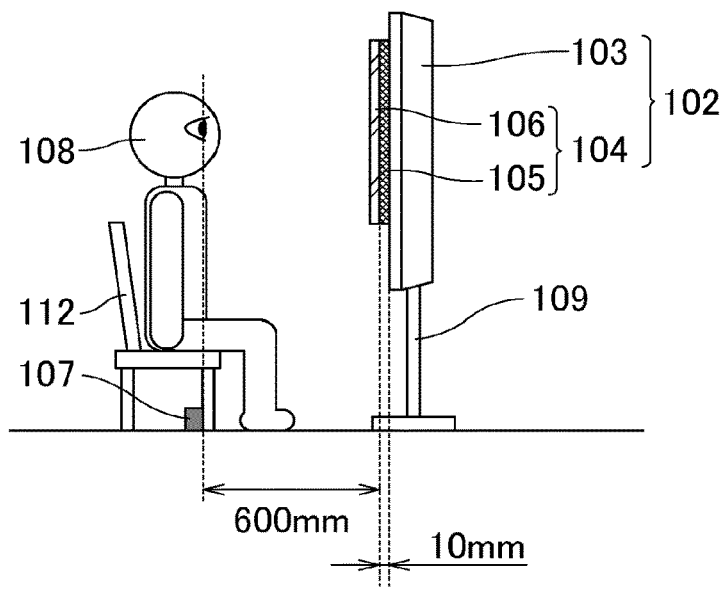
FIG. 41 is a schematic cross-sectional view of a mirror display unit of Comparative Example 2.
Figure 42:
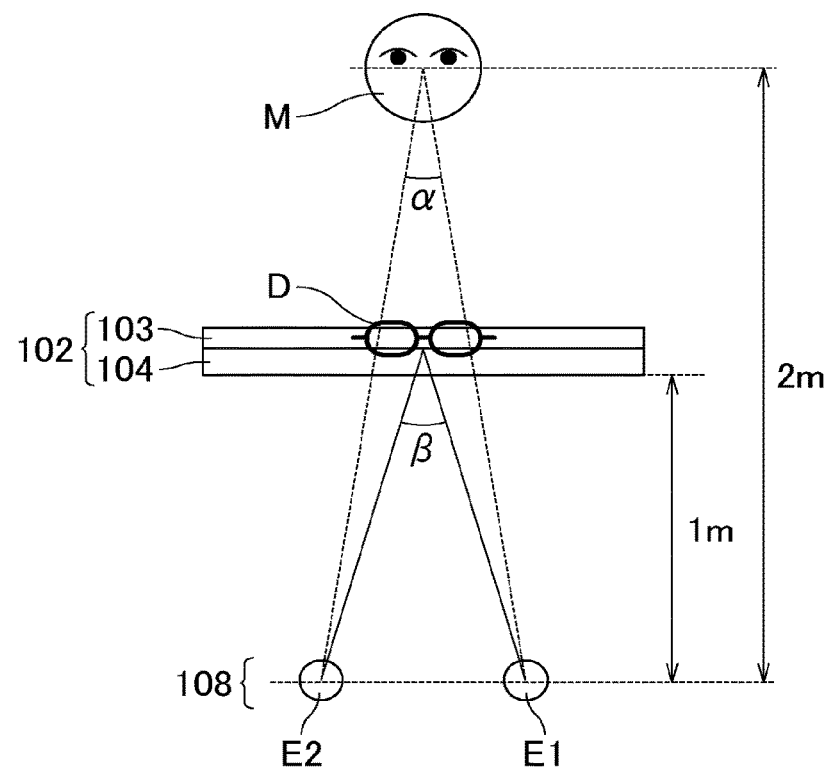
FIG. 42 is a schematic view illustrating a relation between a mirror image and an image in a conventional mirror display.

FIG. 41 is a schematic cross-sectional view of a mirror display unit of Comparative Example 2. As shown in FIG. 41, a mirror display unit 101b includes the mirror display 102 and the tape 107 and a seat 112 as guiding members disposed on the viewer side of the mirror display 102. The mirror display 102 includes, in the order from the back surface side to the viewer side, the liquid crystal display device 103 and the half mirror plate 104. The position of the seat 112 was adjusted such that the eyes of the viewer 108 sitting on the seat 112 were 600 mm apart from the viewer 108-side display surface of the half mirror plate 104 toward the viewer 108 side. In the present comparative example, the tape 107 was attached to the floor as a mark indicating the position of the seat 112.

The mirror display 102, in which the display surface of the liquid crystal display device 103 and the display surface of the half mirror plate 104 are placed substantially in close contact with each other as in conventional mirror displays, fails to bring the mirror image and the image close to the positions with the same depth. Moreover, since the mirror display unit 101b has a configuration in which the distance between the display surface of the liquid crystal display device 103 and the display surface of the half mirror plate 104 significantly differs from the distance between the display surface of the half mirror plate 104 and the seat 112 (viewer 108), large differences are unfortunately caused between the focal point and convergence angle for viewing the mirror image and those for viewing the image. Accordingly, the configuration of Comparative Example 2 fails to suppress uncomfortable feeling and thus results in failure in simultaneous perception of the mirror image and the image.

[Evaluation Results]

The evaluation results of the appearances of the mirror images and images of the mirror display units of Examples 1 to 38 and Comparative Examples 1 and 2 are summarized in Table 1.

The appearances of the mirror image and the image were evaluated by the following method on the assumption that virtual fitting of glasses and clothes was performed.

(1) An image for evaluation of a pair of glasses drawn on a black background and an image for evaluation of a tie drawn on a black background were displayed on each of the liquid crystal display devices of the examples and comparative examples. Here, since each image for evaluation has a black background, the background region, namely, the region where the images of the glasses and tie are not displayed, functions as a mirror. Meanwhile, the region where the image of the glasses or tie is displayed functions as a display.

(2) Viewers (18 nonspecialists having a corrected visual acuity of not lower than 0.8 for each eye) evaluated if his/her own face (mirror image) matched the glasses and tie (images) without uncomfortable feeling. The evaluation indices used were: excellent: simultaneously perceptible without uncomfortable feeling, better: simultaneously perceptible with little uncomfortable feeling, good: simultaneously perceptible with some uncomfortable feeling, and poor: simultaneously imperceptible and accompanied by uncomfortable feeling. Here, the cases with the evaluation results of excellent, better, and good were considered to have achieved the effects of the present invention.

TABLE 1

|  | Evaluation result |
| --- | --- |
| Example 1 | Excellent |
| Example 2 | Excellent |
| Example 3 | Excellent |
| Example 4 | Excellent |
| Example 5 | Excellent |
| Example 6 | Excellent |
| Example 7 | Excellent |
| Example 8 | Excellent |
| Example 9 | Excellent |
| Example 10 | Excellent |
| Example 11 | Excellent |
| Example 12 | Excellent |
| Example 13 | Excellent |
| Example 14 | Excellent |
| Example 15 | Excellent |
| Example 16 | Excellent |
| Example 17 | Excellent |
| Example 18 | Excellent |
| Example 19 | Excellent |
| Example 20 | Excellent |
| Example 21 | Excellent |
| Example 22 | Excellent |
| Example 23 | Excellent |
| Example 24 | Excellent |
| Example 25 | Excellent |
| Example 26 | Excellent |
| Example 27 | Better |
| Example 28 | Excellent |
| Example 29 | Better |
| Example 30 | Excellent |
| Example 31 | Better |
| Example 32 | Excellent |
| Example 33 | Better |
| Example 34 | Better |
| Example 35 | Good |
| Example 36 | Good |
| Example 37 | Good |
| Example 38 | Good |
| Comparative Example 1 | Poor |
| Comparative Example 2 | Poor |

As shown in Table 1, all of the mirror display units of Examples 1 to 38 were evaluated to have a better appearance of the mirror image (face of the viewer) and the images (glasses and tie) than the mirror display units of Comparative Examples 1 and 2. Particularly, the mirror display units of Examples 1 to 26, 28, 30, and 32 were evaluated that the mirror image (face of the viewer) and the images (glasses and tie) were perceived at the positions with the same depth and were simultaneously perceptible without uncomfortable feeling. In other words, the viewers felt as if he/she actually tried on the glasses and tie and checked them in a full-length mirror. Accordingly, only displaying images of glasses and ties with different colors or shapes could provide the viewers the images in which he/she tried on the glasses and ties with different colors or shapes. Thus, the virtual fitting experience was achieved with improved practicability. Also, in order to sufficiently achieve the effects of the present invention, preferred among the mirror display units of Examples 1 to 38 are the cases where the difference between the distance between the display surface of the liquid crystal display device and the display surface of the half mirror plate and the distance between the display surface of the half mirror plate and the viewer is not more than 300 mm (Examples 1 to 34), and more preferred are the cases where the difference therebetween is 0 mm (the same) (Examples 1 to 26, 28, 30, and 32).

In the mirror display units of Examples 9 to 12, double vision of the display image was suppressed and the reality of virtual fitting experience was enhanced compared to the mirror display units of the other examples. The mirror display units of Examples 13 to 20 achieved improved function both as a mirror and as a display and a better viewing angle than the mirror display units of the other examples even when the mirror displays were viewed from an oblique direction. In the mirror display units of Examples 21 to 26, the viewer can freely select the viewing position and the position of the liquid crystal display device is easily adjusted according to the viewing position. Thus, it can provide more natural virtual fitting experience with less stress, which resulted in better usability.

In contrast, in the mirror display units of Comparative Examples 1 and 2, the viewers failed to simultaneously perceive the mirror image (face of the viewer) and the images (glasses and tie) without uncomfortable feeling. In the mirror display units of Comparative Examples 1 and 2, when the viewers tried to focus on one of the mirror image (face of the viewer) and the images (glasses and tie), they could not focus on the other at all. Thus, they failed to have feeling as if they actually wore the glasses and tie.

[Additional Remarks]

The following are the examples of preferred embodiments of the mirror display of the present invention. The respective examples may be appropriately employed in combination within the spirit of the present invention.

The distance between the display surface of the display device and the display surface of the half mirror plate is not smaller than 100 mm. This distance is determined under consideration of the conditions where virtual fitting of glasses or clothes (e.g. the distance between the display surface of the half mirror plate and the viewer) is performed and the fact that the near point distance, i.e., the shortest distance on which the crystalline lens of a human eye can focus, is usually not shorter than 100 mm. The distance between the display surface of the display device and the display surface of the half mirror plate is not particularly limited as long as it is not smaller than 100 mm. In order to more improve the practicability for use such as virtual fitting experience of glasses or clothes, the distance is preferably not smaller than 300 mm, more preferably not smaller than 400 mm. In addition, in the case where the mirror display of the present invention is applied to a virtual fitting system, the distance between the display surface of the display device and the display surface of the half mirror plate is preferably equal to or smaller than the distance (visual distance) between the display surface of the half mirror plate and the viewer when the mirror display is used. This is because if the distance between the display surface of the display device and the display surface of the half mirror plate is beyond the visual distance, the image is perceived at a position behind the mirror image. In the case where the mirror display of the present invention is applied to virtual fitting of clothing covering the back of the head or to applications other than virtual fitting system (e.g. game machine), setting the distance between the display surface of the display device and the display surface of the half mirror plate longer than the visual distance when the mirror display is used can achieve the effect in which the image is perceived behind the mirror image.

The display surface of the display device refers to the surface of the member disposed nearest to the viewer among the members that contribute to display, namely, the members that change the optical state (e.g. polarization state). For example, it refers to the viewer-side surface of the polarizer. The display surface of the half mirror plate refers to the surface of the member with a high (the highest) reflectance, i.e., the viewer-side surface of the half mirror layer (e.g. reflective polarizer). There are some cases in which the display surface of the display device and the display surface of the half mirror plate respectively correspond to the viewer-side outermost surface of the display device and the viewer-side outermost surface of the half mirror plate. Meanwhile, if a member (e.g. transparent protective plate) that does not contribute to display is disposed on the outermost surface of each of the above members, the member like the protective plate is not taken as the display surface.

The mirror display may further include an antireflection film, and the antireflection film may be bonded to at least one of a viewer-side surface of the display device and a back-surface-side surface of the half mirror plate. This configuration can suppress double vision of the display image utilizing the antireflection performance of the antireflection film. In order to sufficiently suppress double vision, the antireflection film is preferably attached to both of the viewer-side surface of the display device and the back-surface-side surface of the half mirror plate.

The antireflection film may have, on the surface thereof, an antireflection structure with multiple protrusions disposed at a pitch not greater than the visible light wavelength. This configuration can sufficiently suppress double vision of the display image utilizing excellent antireflection performance of the antireflection film having a moth-eye structure.

The mirror display may further include a light-shielding material, and the light-shielding material may have a hollow shape with apertures disposed on the viewer side and the back surface side and connect the display device and the half mirror plate. This configuration can achieve improved function both as a mirror and as a display and a better viewing angle utilizing the light-shielding performance of the light-shielding material even when the mirror display is viewed from an oblique direction.

The display device may have a display region larger than the half mirror plate in a plan view from the viewer side. This configuration can achieve improved function both as a mirror and as a display and a better viewing angle utilizing the effect of an enlarged display region of the display device even when the mirror display is viewed from an oblique direction.

The half mirror layer may include a reflective polarizer. This configuration enables suitable use of the present invention even in the case of using a reflective polarizer as a half mirror layer. Moreover, combination use with a liquid crystal display device enables both of the visibility of the mirror image and the visibility of the image. Also, an arrangement in which multiple reflective polarizers as half mirror layers are placed such that the respective transmission axes cross each other can sufficiently enhance the reflectance of the mirror.

The display device may be a liquid crystal display device. This enables suitable use of the present invention even in the case of using a liquid crystal display device as a display device. Moreover, combination use with a reflective polarizer can achieve both of the visibility of the mirror image and the visibility of the image.

The following are examples of the preferred embodiments of the mirror display unit of the present invention. The respective examples may be appropriately employed in combination within the spirit of the present invention.

The distance between the display surface of the display device and the display surface of the half mirror plate and the distance between the display surface of the half mirror plate and the guiding member may be substantially equal to each other. This configuration enables the focal point and convergence angle for viewing the mirror image to be substantially the same as those for viewing the image, which can sufficiently suppress uncomfortable feeling between the mirror image and the image. In order to completely prevent uncomfortable feeling between the mirror image and the image, the distance between the display surface of the display device and the display surface of the half mirror plate and the distance between the display surface of the half mirror plate and the guiding member are preferably equal to each other. The guiding member functions as a mark for indicating the position (viewing position) of the viewer. The phrase "the distance between the display surface of the display device and the display surface of the half mirror plate and the distance between the display surface of the half mirror plate and the guiding member are substantially equal to each other" means that the difference between the distance between the display surface of the display device and the display surface of the half mirror plate and the distance between the display surface of the half mirror plate and the guiding member is not more than 300 mm.

The mirror display unit may further include a positioning mechanism, and the positioning mechanism may be configured to adjust the distance between the display surface of the display device and the display surface of the half mirror plate according to the distance between the display surface of the half mirror plate and the guiding member. The positioning mechanism enables easy adjustment of the distance between the display surface of the display device and the display surface of the half mirror plate to be equal to the distance between the display surface of the half mirror plate and the guiding member.

The guiding member may include a seat. This enables effective use of the guiding member utilizing the effect of the seat that indicates the position of the viewer.

The distance between the display surface of the display device and the display surface of the half mirror plate and the distance between the display surface of the half mirror plate and the viewer may be substantially equal to each other. This configuration enables the focal point and convergence angle for viewing the mirror image to be substantially the same as those for viewing the image, which can sufficiently suppress uncomfortable feeling between the mirror image and the image. In order to completely prevent uncomfortable feeling between the mirror image and the image, the distance between the display surface of the display device and the display surface of the half mirror plate and the distance between the display surface of the half mirror plate and the viewer are preferably equal to each other. The phrase "the distance between the display surface of the display device and the display surface of the half mirror plate and the distance between the display surface of the half mirror plate and the viewer are substantially equal to each other" means that the difference between the distance between the display surface of the display device and the display surface of the half mirror plate and the distance between the display surface of the half mirror plate and the viewer is not more than 300 mm.

The mirror display unit may further include a positioning mechanism, and the positioning mechanism may be configured to adjust the distance between the display surface of the display device and the display surface of the half mirror plate according to the distance between the display surface of the half mirror plate and the viewer. The positioning mechanism enables easy adjustment of the distance between the display surface of the display device and the display surface of the half mirror plate and the distance between the display surface of the half mirror plate and the viewer to be equal to each other.

REFERENCE SIGNS LIST 1a, 1b, 1c, 1d, 1e, 1f, 1g, 1h, 1j, 1k, 1m, 1n, 1p, 1q, 1r, 1s, 1t, 1u, 1v, 1w, 1x, 1y, 1z, 1a', 1b', 1c', 1d', 1e', 1f', 1g', 1h', 1j', 1k', 1m', 1n', 1p', 1q', 1r', 101a,
101b: mirror display unit
2a, 2b, 2c, 2d, 102: mirror display
3a, 3b, 103: liquid crystal display device
4, 104: half mirror plate
5, 105: reflective polarizer
6, 106: glass substrate
7a, 7b, 107: tape
8, 108: viewer
9, 109: stand
10: wall
11: case
12, 112: seat
13a, 13b: antireflection film
14: light-shielding material
15: rail
16: length measurement sensor
T: transmitted light
A: multiple reflection components
M: mirror image
D: image
E1, E2: eye
α, β: convergence angle

The invention claimed is:

1. A mirror display unit comprising:
a mirror display including a half mirror plate that includes a half mirror layer, and a display device; and
a guiding member, wherein
the display device is on a back surface side of the half mirror plate,
a distance between a display surface of the display device and a display surface of the half mirror plate is not less than 100 mm,
the guiding member is on a viewer side of the mirror display, and
the guiding member includes a seat.

2. The mirror display unit according to claim 1, further comprising an antireflection film,
wherein the antireflection film is bonded to at least one of a viewer-side surface of the display device and a back-surface-side surface of the half mirror plate.

3. The mirror display unit according to claim 2, wherein the antireflection film includes, on a surface thereof, an antireflection structure with multiple protrusions disposed at a pitch not greater than a visible light wavelength.

4. The mirror display unit according to claim 1, further comprising a light-shielding material,
wherein the light-shielding material has a hollow shape with apertures disposed on a viewer side and a back surface side, and connects the display device and the half mirror plate.

5. The mirror display unit according to claim 1, wherein the display device includes a display region larger than the half mirror plate when viewed in a plan view from a viewer side.

6. The mirror display unit according to claim 1, wherein the half mirror layer includes a reflective polarizer.

7. The mirror display unit according to claim 1, wherein the display device is a liquid crystal display device.

8. The mirror display unit according to claim 1, wherein the distance between the display surface of the display device and the display surface of the half mirror plate and a distance between the display surface of the half mirror plate and the guiding member are substantially equal to each other.

9. The mirror display unit according to claim 8, further comprising a positioning mechanism,
wherein the positioning mechanism adjusts the distance between the display surface of the display device and the display surface of the half mirror plate according to the distance between the display surface of the half mirror plate and the guiding member.

10. A mirror display unit comprising:
a mirror display including a half mirror plate that includes a half mirror layer, and a display device; and
a length measurement sensor, wherein
the display device is on a back surface side of the half mirror plate,
a distance between a display surface of the display device and a display surface of the half mirror plate is not less than 100 mm,
the half mirror layer includes a reflective polarizer,
the display device includes a viewer-side absorptive polarizer and a back-surface-side absorptive polarizer,
a transmission axis of the viewer-side absorptive polarizer and a transmission axis of the reflective polarizer are parallel to each other,
the length measurement sensor measures a distance between the display surface of the half mirror plate and a viewer, and
the distance between the display surface of the display device and the display surface of the half mirror plate and the distance between the display surface of the half mirror plate and the viewer are substantially equal to each other.

11. The mirror display unit according to claim 10, further comprising a positioning mechanism,
wherein the positioning mechanism adjusts the distance between the display surface of the display device and the display surface of the half mirror plate according to the distance between the display surface of the half mirror plate and the viewer.

12. The mirror display unit according to claim 10, further comprising an antireflection film,
wherein the antireflection film is bonded to at least one of a viewer-side surface of the display device and a back-surface-side surface of the half mirror plate.

13. The mirror display unit according to claim 12, wherein the antireflection film includes, on a surface thereof, an antireflection structure including multiple protrusions disposed at a pitch not greater than a visible light wavelength.

14. The mirror display unit according to claim 10, further comprising a light-shielding material,
wherein the light-shielding material has a hollow shape including apertures disposed on a viewer side and a back surface side, and connects the display device and the half mirror plate.

15. The mirror display unit according to claim 10, wherein the display device includes a display region larger than the half mirror plate when viewed in a plan view from a viewer side.

16. The mirror display unit according to claim 10, wherein the display device is a liquid crystal display device.

* * * * *